(12) United States Patent
Hyakutake

(10) Patent No.: US 6,788,709 B1
(45) Date of Patent: Sep. 7, 2004

(54) METHOD FOR TRANSMITTING AND DISPLAYING INFORMATION AND DEVICE FOR DISPLAYING INFORMATION

(75) Inventor: Kunihiro Hyakutake, Tokyo (JP)

(73) Assignee: Kabushiki Kaisha Infocity, Tokyo (JP)

(*) Notice: Subject to any disclaimer, the term of this patent is extended or adjusted under 35 U.S.C. 154(b) by 0 days.

(21) Appl. No.: 09/180,495

(22) PCT Filed: May 13, 1997

(86) PCT No.: PCT/JP97/01599

§ 371 (c)(1),
(2), (4) Date: Nov. 10, 1998

(87) PCT Pub. No.: WO97/43855

PCT Pub. Date: Nov. 20, 1997

(30) Foreign Application Priority Data

| | | |
|---|---|---|
| May 16, 1996 | (JP) | HO8-122065 |
| Sep. 30, 1996 | (JP) | HO8-279937 |
| Apr. 2, 1997 | (JP) | HO9-083601 |

(51) Int. Cl.[7] .................................................. H04J 1/00
(52) U.S. Cl. ...................................... 370/486; 370/535
(58) Field of Search ................................ 370/486, 485, 370/535, 542; 348/423.1

(56) References Cited

U.S. PATENT DOCUMENTS

| | | | | |
|---|---|---|---|---|
| 5,036,394 A | * | 7/1991 | Morii et al. ................. | 358/146 |
| 5,502,497 A | * | 3/1996 | Yamaashi et al. ........... | 348/473 |
| 5,559,548 A | * | 9/1996 | Davis et al. .................. | 348/6 |
| 5,559,999 A | * | 9/1996 | Maturi et al. ................ | 395/550 |
| 5,668,601 A | * | 9/1997 | Okada et al. ................ | 348/423 |
| 5,818,935 A | * | 10/1998 | Maa ............................. | 380/20 |
| 5,889,564 A | * | 3/1999 | Tsukagoshi .................. | 348/594 |
| 5,892,535 A | * | 4/1999 | Allen et al. ...................... | 348/9 |
| 6,185,360 B1 | * | 2/2001 | Inoue et al. .................. | 386/46 |
| 6,292,226 B1 | * | 9/2001 | Yamanaka et al. .......... | 348/556 |

FOREIGN PATENT DOCUMENTS

| | | |
|---|---|---|
| EP | 0 622 770 A | 7/1995 |
| EP | 0 680 216 A | 11/1995 |
| EP | 0 765 082 A | 3/1997 |
| JP | 60103888 | 6/1985 |
| JP | 1302978 | 12/1989 |
| JP | 5244504 | 9/1993 |
| JP | 5252495 | 9/1993 |
| JP | H06-6773 | 1/1994 |
| WO | WO 95/01058 A | 1/1995 |

OTHER PUBLICATIONS

Role of TV in Multi–Media Era, 1995, vol. 49, No. 11—The Journal of the Institute of Television Engineers in Japan.

* cited by examiner

Primary Examiner—Kenneth Vanderpuye
(74) Attorney, Agent, or Firm—Notaro & Michalos P.C.

(57) ABSTRACT

Content body and B-HTTP elements are broadcast to a user's system (20) by means of messages inserted into the vertical blanking intervals of a television signal. At the user's system, the messages are stored on the hard disk, and the messages are retrieved by using the information in the effective period start time element, which is one of the elements (S102). The browser (47) displays on the screen (47a) the content body among the messages (S107).

2 Claims, 29 Drawing Sheets

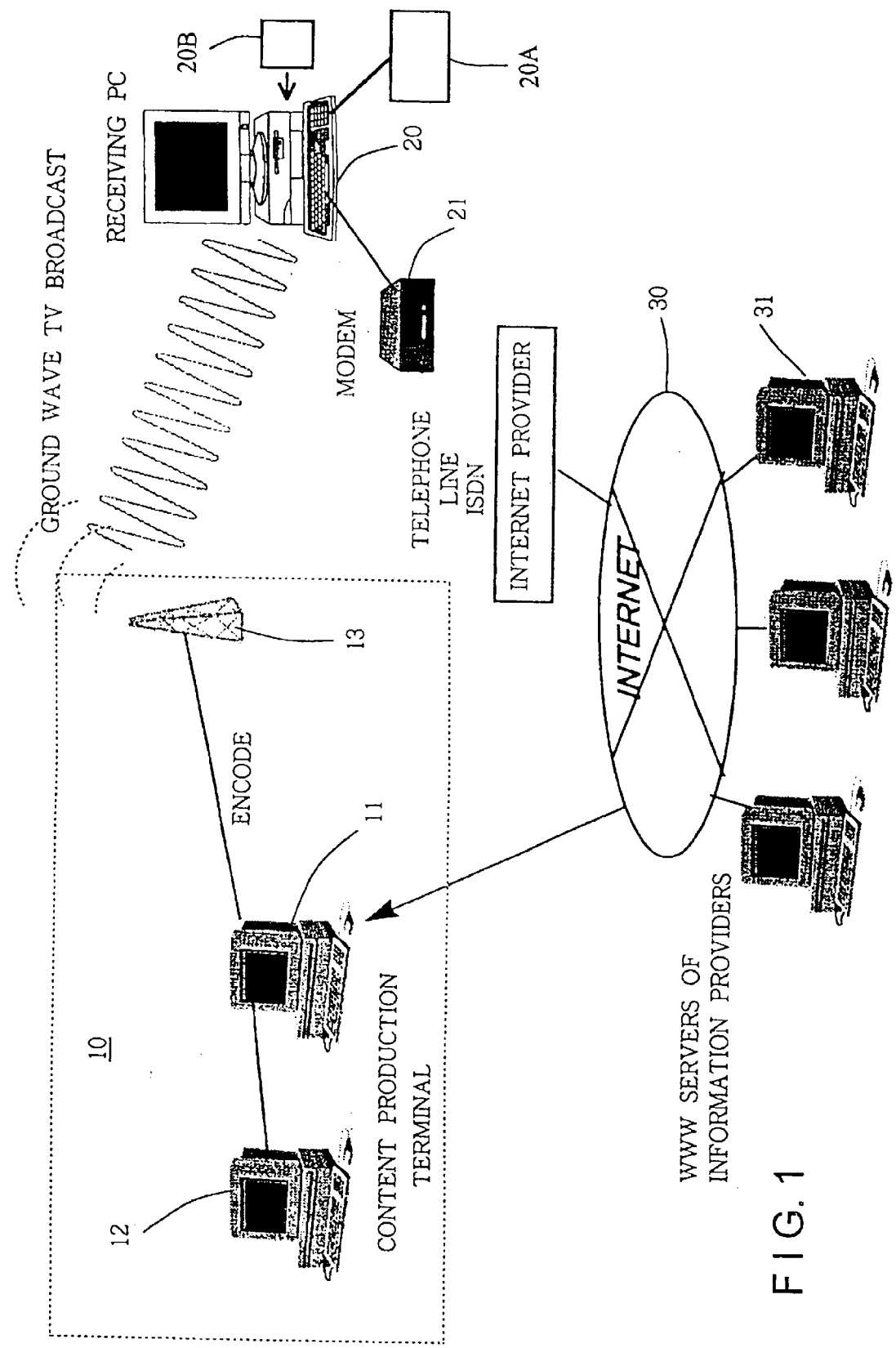
F I G. 1

HORIZONTAL SCAN INTERVALS FOR VBI

| H.S. INTERVAL NO. | | USE PURPOSE | H.S. INTERVAL NO. | | USE PURPOSE |
| --- | --- | --- | --- | --- | --- |
| EVEN FIELD | ODD FIELD | | EVEN FIELD | ODD FIELD | |
| 1 | 263 | EQUALIZING PULSE | 12 | 274 | VBI |
| 2 | 264 | | 13 | 275 | |
| 3 | 265 | | 14 | 276 | |
| 4 | 266 | VERTICAL SYNC. PULSE | 15 | 277 | TELETEXT BROADCAST |
| 5 | 267 | | 16 | 278 | |
| 6 | 268 | | 17 | 279 | |
| 7 | 269 | EQUALIZING PULSE | 18 | 280 | FOR BROADCAST STATION |
| 8 | 270 | | 19 | 281 | |
| 9 | 271 | | 20 | 282 | |
| 10 | 272 | VBI | 21 | 283 | TELETEXT |
| 11 | 273 | | 22 | 284 | VIDEO START |

STRUCTURE OF HORIZONTAL SCAN INTERVAL

CONTENTS MESSAGE
(CONTENT TYPE)
GROUP MESSAGE
(GROUP INF. TYPE)
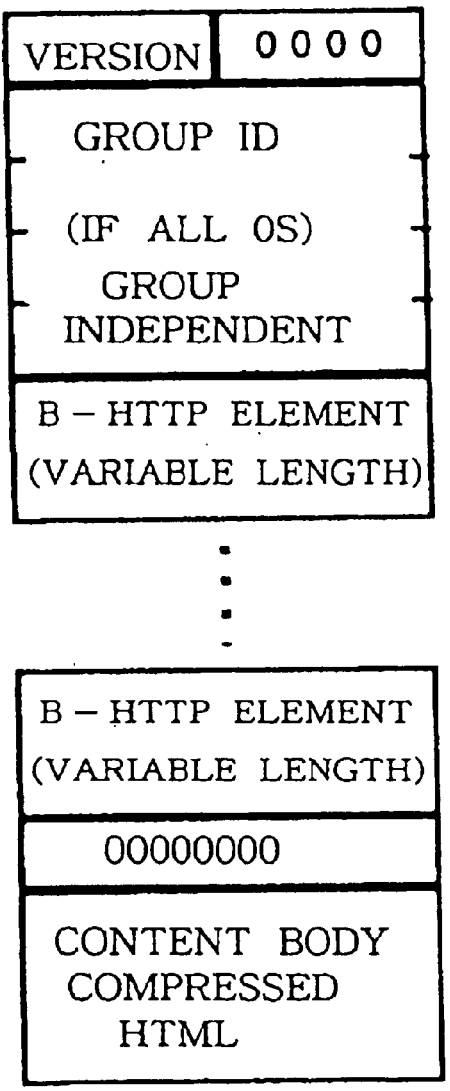
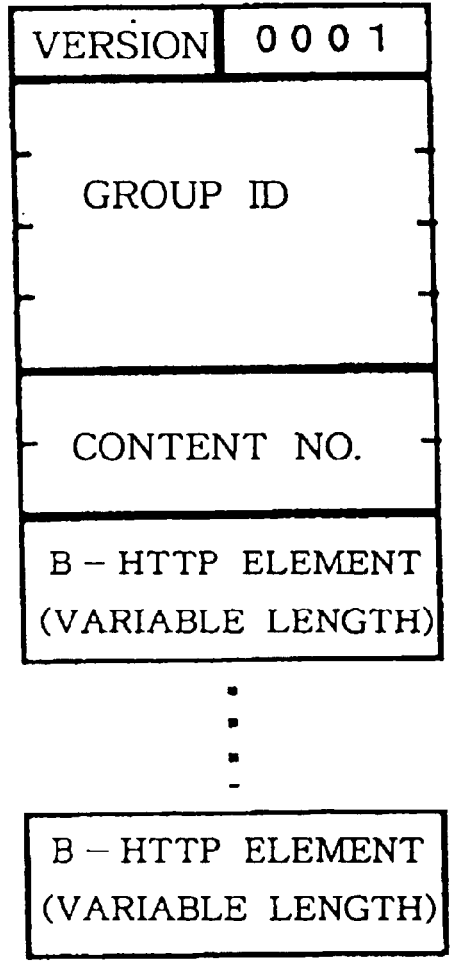
Bitcast HTTP FORMAT
F I G. 5

LAYOUT ELEMENT
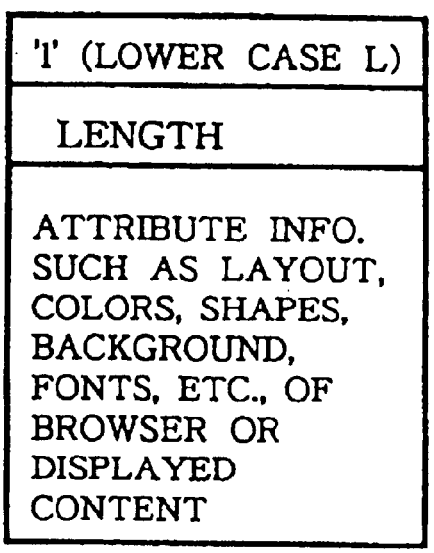
MENU ELEMENT
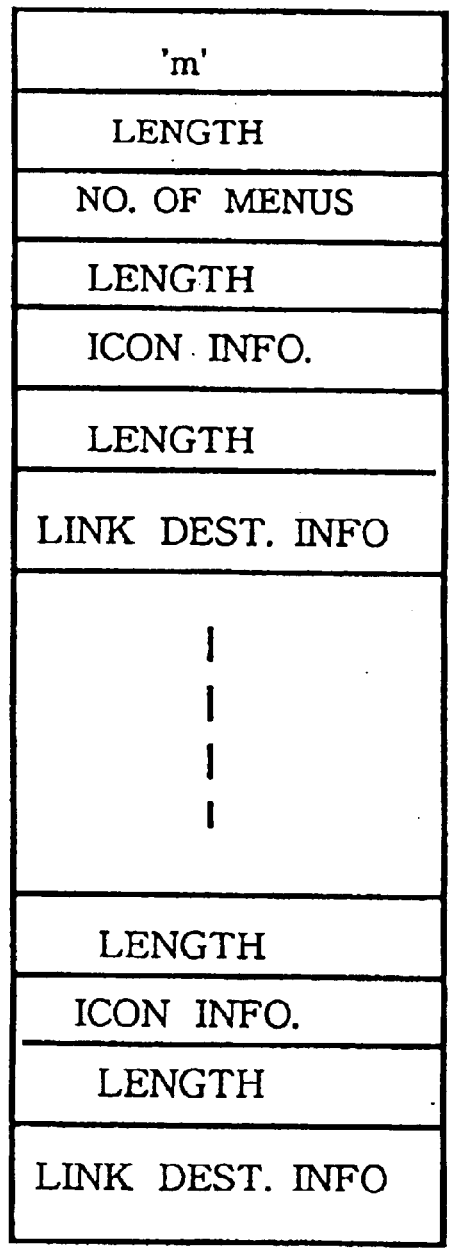
ENCRYPTION ELEMENT
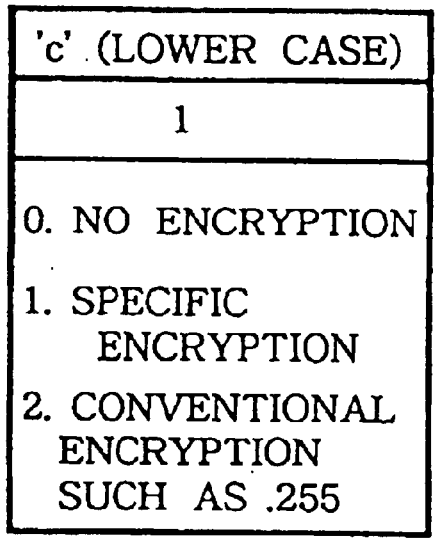
F I G. 7

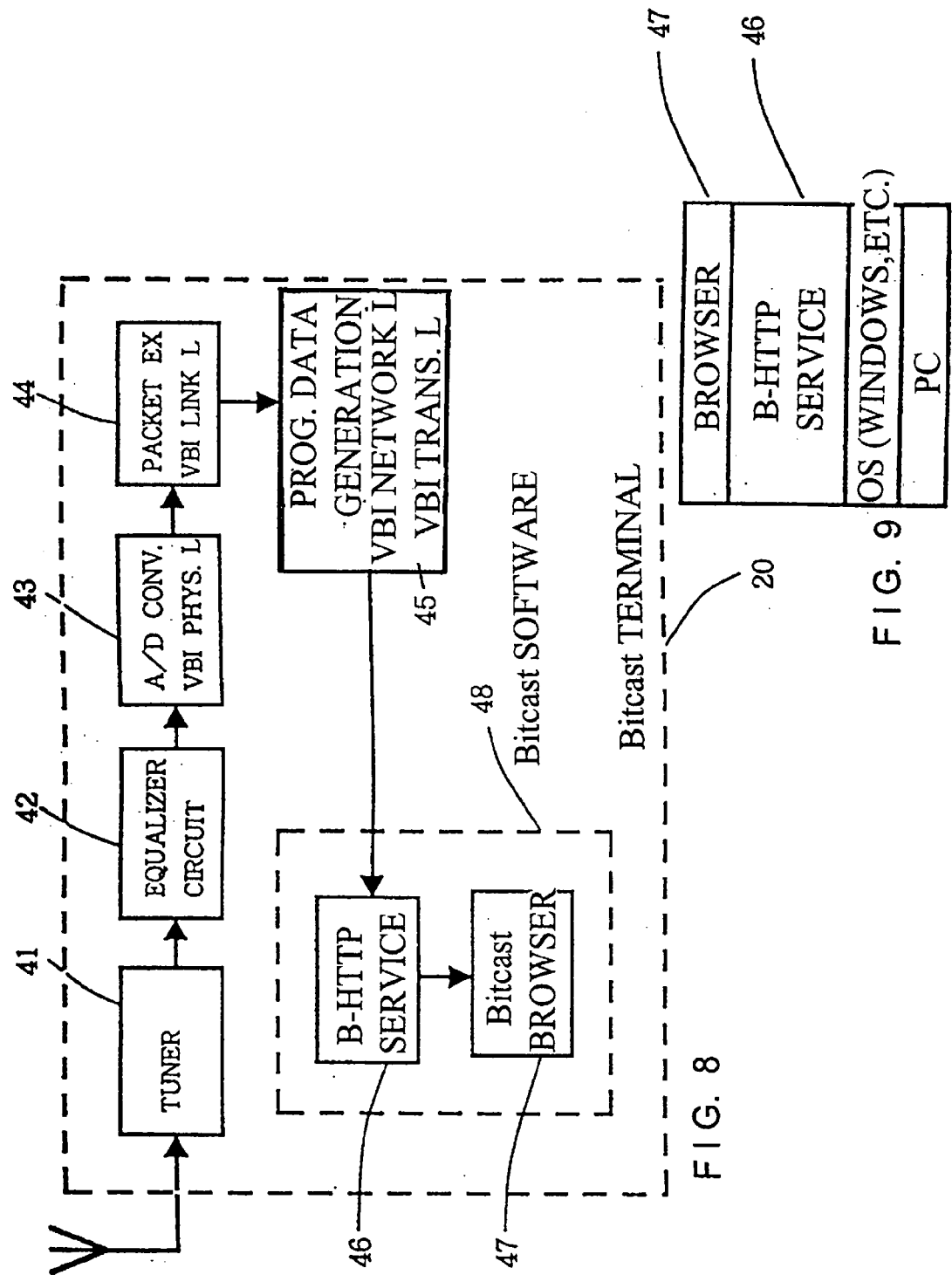
F I G. 8
F I G. 9

DISPLAY TIMING ORDER INDEX LIST

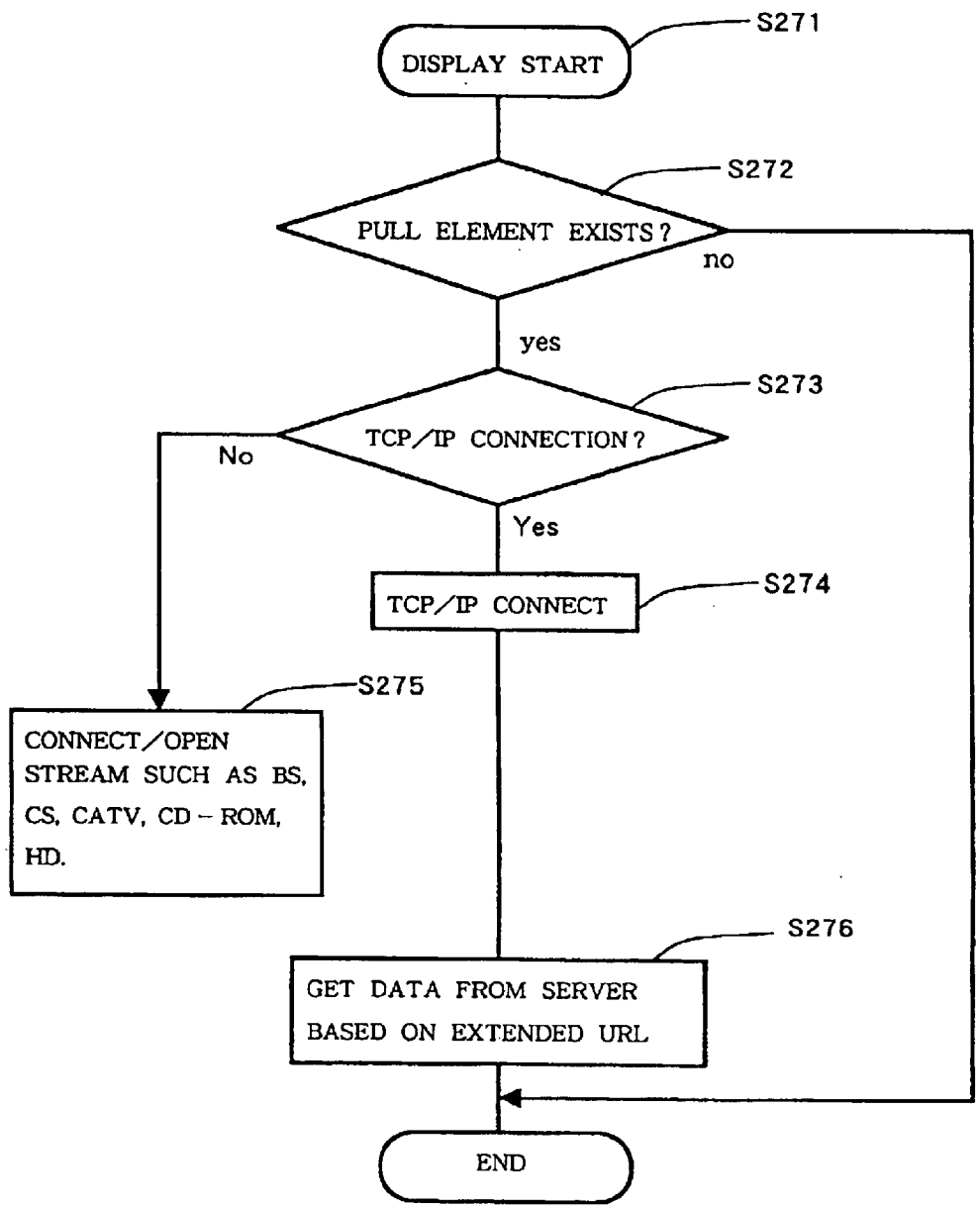
F I G. 3 2

METHOD FOR TRANSMITTING AND DISPLAYING INFORMATION AND DEVICE FOR DISPLAYING INFORMATION

TECHNICAL FIELD

The present invention relates to an information transmission method, a information display method and an information display apparatus that displays content information (e.g., Internet content information or related content information) multiplexed in a television broadcast, for example, and more particularly to one that can display the corresponding content information, etc., by interlocking with the main broadcast content.

BACKGROUND ART

Various services that utilize the Internet have become available recently. A user can enjoy such services as information provision by accessing servers that provide services on the Internet. However, services on the Internet are based upon communications processing. Basically, a communications channel must be set up between a service provider and a service recipient, so the service provision is limited quantitatively.

By contrast, broadcasting has the merit of being able to provide information simultaneously to an unspecified multitude of recipients within the range of the broadcast signal. The present invention provides technology that is suitable for allowing many recipients to effectively utilize Internet content information, by multiplexing the Internet content information or related information in the television broadcast.

Furthermore, teletext broadcasting technology is related to the present invention. The teletext broadcasting technology broadcasts characters in addition to the normal broadcast, by inserting the character information in the vertical blanking interval of the television broadcast.

The present invention accordingly aims at providing information display technology that can display either content information transmitted after being multiplexed in the broadcast signal or a part thereof, interlocked with the contents of the broadcast.

DISCLOSURE OF THE INVENTION

In order to attain this object, the information transmission and display method of the present invention comprises the steps of: multiplexing, in the broadcast signal, content information and information regarding timing for displaying the content information on a display device; transmitting the multiplexed broadcast signal; receiving the multiplexed broadcast signal; extracting the timing information and the content information from the multiplexed broadcast signal; and displaying at least a part of the content information on the display device, based upon the timing information.

In this configuration, the content information and the display timing information are multiplexed in the broadcast signal and are then broadcast, so it is possible to display content or a part thereof at the desired time. For example, it is possible to interlock the display of content information or a part thereof with the broadcast contents.

Also, in this configuration, the broadcast signal can be a television broadcast signal. Also, the content information and the timing information can be multiplexed by inserting them into vertical blanking intervals of a television broadcast signal. Also, the timing information can be display time of the content information. The display time can be expressed as a relative time relative to the time when the content information is received. Also, the content information can be either a program code or hypertext (including hypermedia), such as web pages provided by a WWW (World Wide Web) server on the Internet.

Also, according to the present invention, in order to attain the object, the information display device comprises: means for receiving a broadcast signal containing multiplexed content information and information regarding timing for displaying the content information on a display device; means for extracting the timing information and the content information from the received broadcast signal; and means for displaying at lead a part of the content information on the display device, based upon the timing information.

Also in this configuration, by utilizing the display timing information, it is possible to display the content information or a part thereof after interlocking with the broadcast contents.

Also, according to the present invention, the information transmission and display method comprises the steps of: transmitting a broadcast signal that contains content information and information regarding timing for displaying the content information on a display device; receiving the broadcast signal; extracting the timing information and the content information from the broadcast signal; and displaying at least some of the content information on the display device, based upon the timing information.

In this configuration, it is possible to display, with predetermined timing, content information (information multiplexed in a main broadcast program, a motion picture of a main broadcast program independently broadcast, data, and other information).

Also, according to the present invention, the information display apparatus comprises: means for receiving a broadcast signal containing content information and information regarding timing for displaying the content information on a display device; means for extracting the timing information and the content information from the received broadcast signal; and means for displaying at least a part of the content information on the display device, based upon the timing information.

In this configuration, also, it is possible to display, with predetermined timing, content information (information multiplexed in a main broadcast program, a motion picture of a main broadcast program independently broadcast, data, and other information).

Also, the present invention can be implemented as a program product.

BRIEF DESCRIPTION OF THE DRAWINGS

FIG. 1 is a schematic diagram depicting the overall embodiment of the present invention;

FIG. 5 is a diagram explaining the format of the data group (message) of the embodiment;

FIG. 7 is a diagram explaining an example of the B-HTTP element of FIG. 5;

FIG. 8 is a program depicting the functional blocks of the implementation of the configuration of FIG. 1 using a personal computer;

FIG. 9 is a diagram explaining the hierarchical structure of the implementation of the configuration of FIG. 1 using a personal computer;

FIG. 32 is a flow chart showing the operation of the automatic capture of data according to the present invention.

BEST MODE FOR CARRYING OUT THE INVENTION

Figures 2, 3:
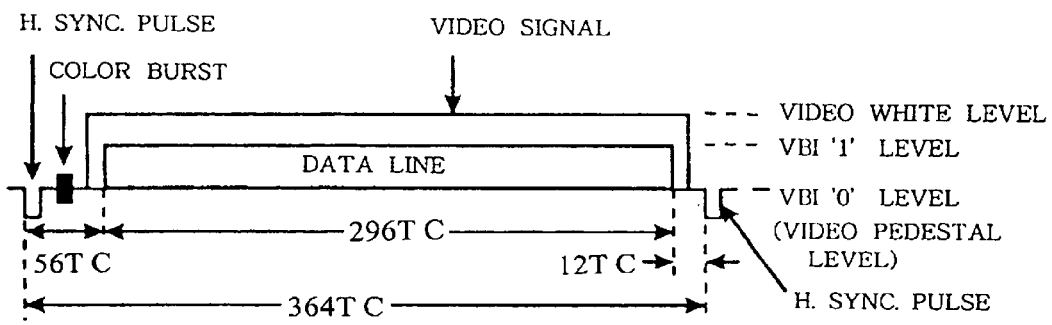
FIG. 2 is a diagram explaining the VBI data multiplexing used in the embodiment.
FIG. 3 is a diagram explaining the VBI data multiplexing used in the embodiment.

Embodiments of the present invention will be described below with reference to the drawing.

FIG. 1 shows an overview of a broadcasting and information processing system in which the present embodiment is applied. In this figure, a broadcast server 11, a content production terminal 12, transmission facilities 13, etc., are provided in a television broadcasting station 10. Prepared broadcast programs are broadcast by means for the broadcast server 11, via the transmission facilities 13. In the present embodiment, the transmission signal of a broadcast program contains an ordinary television signal and a content information signal multiplexed in the vertical blanking intervals of that television signal. At the receiving side, the broadcast signal is received via an antenna (not shown), and the broadcast signal is restored by a television receiver, a personal computer with a television reception function, etc. In the figure, a personal computer 20 having a television reception function is shown as an example. The personal computer 20 has a function that demodulates the broadcast signal. Based upon the demodulated signal, it regenerates the television picture, in a full screen or a part of the screen. Also, as shown in the figure, the personal computer 20 may be connected to a telephone line via a modem 21. The personal computer 20 is connected to the Internet 30 via the model 21, etc. (if necessary, via a provider's communication channel), and various servers are connected to the Internet. In this embodiment, the WWW server 31 for information provision is connected.

Furthermore, a storage medium 20b (e.g., floppy disk, CD-ROM) is used in order to install the Bitcast software 48 mentioned later (see FIG. 8) on the personal computer 20. Also, the device 20a (e.g., a data storage device such as a CD-ROM drive or DVD (digital video disk) drive, a set-top box or a tuner for BS broadcasts, CS broadcasts, cable television broadcasts) supplies data to the personal computer 20. In this embodiment, although the device 20a is attached externally to the personal computer 20, equivalent cards and equipment may be housed within the personal computer 20.

In the present embodiment, the broadcasting station 10 receives web information (web pages) described in HTML (HyperText Markup Language) from a WWW server and broadcasts this information after multiplexing it in the broadcast signal of an ordinary broadcast program. In this case, rather than being transmitted directly, the web information may be transmitted after being processed by means of the content production terminal 12, or information prepared separately by means of the content production terminal 12 may be transmitted. A multiplexing method and the format of the information transmitted after multiplexing will be described later.

The method for multiplexing information in a television broadcast will be explained next. The content information is multiplexed by inserting it into the vertical blanking intervals of the television signal. More specifically, this is performed by using a digital information multiplexing method (normally called as a VBI (vertical blanking interval) method) specified by the advisory report 83 of the first group of the Telecommunications Technology Commission.

That is, the television signal has 262.5 horizontal scan intervals per field (i.e., 525 per frame), of which the first 21 horizontal scan intervals form a vertical blanking interval, which is not displayed by an ordinary television receiver. FIG. 2 shows the roles of these 21 horizontal scan intervals. (Also shown is the 22nd scan interval that is the beginning of the image.) Furthermore, in the figure, horizontal scan intervals 263–283 of an odd-numbered fields are counted within one frame, so they become 1–21 within one field. As is apparent from the figure, the data for character multiplexing are multiplexed in the 14th, 15th, 16th, and 21st (i.e., the 276th, 277th, 278th, and 283rd) horizontal scan intervals. On the other hand, they are released for digital broadcasting (for VBI) to the 10th, 11th, 12th, and 13th (i.e., 272nd, 273rd, 274th, and 275th) horizontal scan intervals, and in this embodiment, the content information is multiplexed in the horizontal scanning interval for this VBI.

FIG. 3 shows how the VBI signal is multiplexed, and the data line is inserted after being converted to a video signal.

Figure 4:
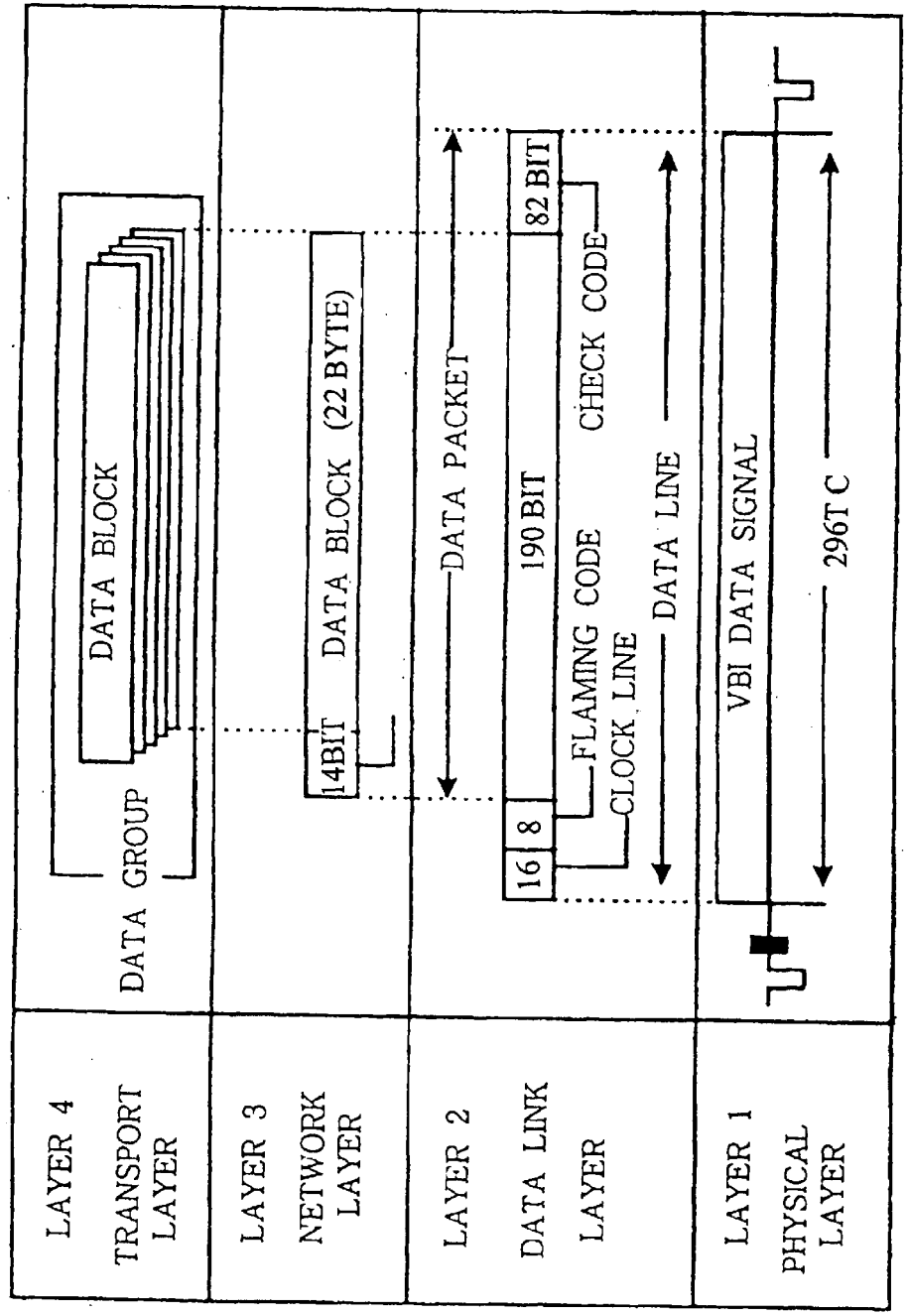
FIG. 4 is a diagram explaining the VBI data multiplexing used in the embodiment.

FIG. 4 shows the specifications of data transmission of the VBI method. In FIG. 4, the layer 1 is a electric-physical specification. According to that specification, a given region within the horizontal scanning interval is sampled at 296 locations. The 0 level of the VBI signal is the pedestal level (black level) of the video signal, and the 1 level is the level at 70% of the video signal's white level.

The layer 2 is the data link layer. Here, the signal is handled as logical data (i.e., 1 and 0). The string of data transmitted in one horizontal scan line is called a data line. A data line consists of data packets. The data packets are protected from errors by means of an error correction code ((272, 190) reduced differential set cyclic code). At the reception side, bit synchronization is obtained based upon the clock line, and the data clock's start can be detected based upon the framing code.

The layer 3 mainly shows the prefix function. The prefix information consists mainly of logical channel information and block linking information. Data blocks are sorted by the logical channel to which the data blocks belong, according to the logical channel information. The block linking information contains such information as link start, end, etc. By means of this information, related data block are linked, thereby generating data groups, which are meaningful collections of data. In this embodiment, this data group is called a message, which is considered a processing unit.

The content information transmitted by means of the VBI method, as aforementioned, will be discussed next. The transmitted content information is mainly web information. However, it may be any form of information. For example, it may be a computer program code.

FIG. 5 shows the data format of the processing unit (i.e., message) of the content information. Hereinafter, this will be called the Bitcast-HTTP format, which will be abbreviated as B-HTTP. (Bitcast is a trademark of Infocity, Inc., HTTP is the abbreviation of a hypertext markup language.) In FIG. 5, there are two types of B-HTTP formats: ① content type and ② group information type. The content type aims at transmitting content itself. The group information type transmits information formed by grouping multiple content items, without aiming at transmitting content itself. Messages with the content-type format are called content messages, and messages with the group information-type format are called group messages.

Content messages are transmitted independently or together with group messages. The group identifier for a content message transmitted independently is all 0s (indicating independence from the group). If a content message is transmitted together with a group message, the group message is transmitted first, and the number of content messages indicated by this group message are transmitted sequentially. In this case, all identifiers of the content messages are identical to the identifier of the group message. In the content message, the information already indicated in the group message (e.g., information specified in the effective period start time element mentioned later) can be omitted.

In FIG. 5, the B-HTTP format consists of a version field (including type identifier), group identifier field, B-HTTP element field, content body field, and field for the separator (all 0s) that partitions the content body and the B-HTTP element. The main fields are as follows:

(1) Version

The high-order 4 bits should be "0000." These are used during protocol conversion. The low-order 4 bits distinguishes between the content message and the group message.

(2) Group identifier

This 32-bit ID identifies the group. If it is set to all 0s in the content type, it indicates information independent from the group.

(3) B-HTTP Element

Figure 6:
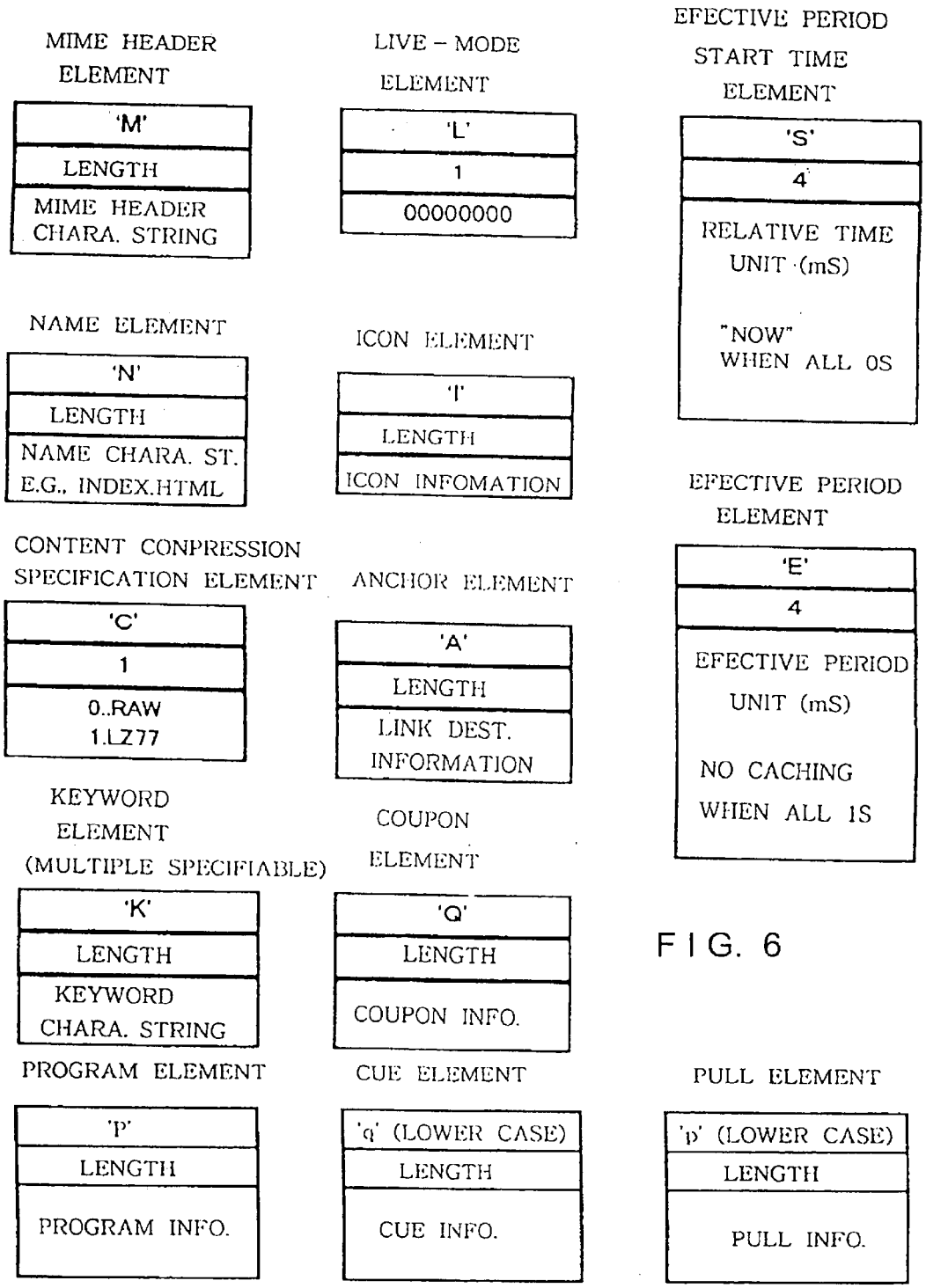
FIG. 6 is a diagram explaining an embodiment of the B-HTTP element of FIG. 5.

These elements provide omittable additional information and will be discussed later with reference to FIGS. 6 and 7.

(4) Content Number

This specifies the number of content messages that belong to a group.

(5) Content Body

This contains the content proper in the content message, that is described by means of HTML (structured document), GIF (image), JPEG (image), etc.

Details of the B-HTTP elements will be explained next. FIGS. 6 and 7 show examples of these elements. In the figure, the elements consist of an identifier, length, and body. The contents will be explained next.

(1) MIME Header

This complies with the HTTP protocol (Multipurpose Internet Mail Extension). Describes the content type, etc.

(2) Name Element

This corresponds to the file name of the URL (Uniform Resource Locator; Internet resource naming rules). Specified by the full path in a content message independent from the group. Specified by the directory name in the group message.

(3) Content Compression Specification Element

This specifies the content compression method. Zero indicates that the content is not compressed.

(4) Keyword Element

This is used for keyword addition and used when performing searching, clipping, etc., discussed later.

(5) Icon Element

This contains information for the icon displayed automatically on part (e.g., the bottom) of the display screen to notify the viewer that the specified message was received (i.e., apparently received). Furthermore, the message actually is received before the effective period's start time, which is discussed later. The effective period's start time corresponds to the apparent reception time. Therefore, it is possible to transmit and receive even messages containing a large amount of data, with a sufficient lead time.

(6) Live-mode Element

This message, which is synchronized with the main television broadcast (i.e., normal broadcast contents), indicates the information to be displayed at the specified time (i.e., the effective period start time).

(7) Effective Period Start Time Element (Relative, Time)

This indicates the time the corresponding message becomes valid, by means of the relative time from the message reception time. In the case of a live-mode message, it contains the time when the contents of the corresponding content message are to be displayed automatically.

Furthermore, this may be displayed by using the absolute time instead of the relative time. In this case, a frame number is added in the UTC (universal time coordinated) format, for example, in order to notify of the time that the corresponding content message becomes effective.

(8) Effective Period Element

This specifies the effective period by using the number of seconds from the effective period start time. At the terminal, the message remains in the cache (i.e., a cache in a direct-access storage device, such as a hard disk) for at least this period. Furthermore, in this example, the effective period element with all 1s (i.e., all bits set to 1) indicates forcibly to delete the message from the cache. That is, the effective element with all 1s is used as a flag that indicates deletion from the cache. Of course, it also is possible to use a characteristic element as this flag. It also is possible to use another specific bit pattern of the effective element. Moreover, it also is possible to use the specific bit pattern of another element.

(9) Anchor Element

This indicates the link-destination resource address information by means of the URL. For example, when an icon is displayed using the message's icon element, it is possible to access the link-destination resource specified by the icon element by clicking the icon. This will be discussed later with reference to FIGS. 20 and 21. When a URL, for example, is used to identify the anchor element, the anchor element looks like "HTTP://www.infocity.co.jp/dirl/index.html". Here, "HTTP" is the transport protocol, "www.infocity.co.jp" is the domain name, and "dir1/index.html" is the path name. Furthermore, in this example, the URL is extended in order to enable access to information from a recording device (e.g., CD-ROM, DVD, hard disk), wire broadcasting of cable television and broadcast signals from broadcast satellites and communications satellites. For example, when acquiring HTML data from channel 11 of a BS broadcast, the URL becomes "HTTP://bitcast/BS11/filename.html". Here, "bitcast" is the proxy server. "BS11" indicates the medium and corresponds to the directory.

(10) Coupon Element

This indicates the right to various services (e.g., online shopping discount services).

(11) Layout Element

This specifies the layout, colors, shapes, background, fonts, and other attribute information for the browser itself or the contents displayed by the browser.

(12) Encryption Element

This indicates the protection technique (e.g., encryption, scrambling).

(13) Menu Element

This is used to display the menu from an icon, and specifies multiple groups of icon information length, icon information, anchor element length, and anchor element (link destination).

(14) Program Element

This contains broadcast program information. A program element can be created and transmitted for each program (a program itself or a commercial). The broadcast program information can consist of such information as the program (the program itself or a commercial) name, the program code (e.g., G code), the broadcast date and time (including year/month/day, day of the week), the cast (performer names) (one or multiple), the program type (e.g. genres such as baseball hookups, movie), and other information. The broadcast program information is not an attribute of the content body, so it can be transmitted without being accompanied by the content body. Of course, it may accompany the content body.

(15) Cue Element

This specifies the start timing for the recording (videotaping) of a broadcast program. The cue element also can be transmitted without accompanying the content body.

(16) Pull Element

This is used to automatically retrieve data from a server, etc., even with specification by the user.

This concludes the explanation of the messages transmitted after being multiplexed with the contents of the main broadcast.

The structure for receiving content information at the personal computer 20 of FIG. 1 will be discussed next, with reference to FIG. 8. Furthermore, in FIG. 8, the personal computer 20 consists of a television signal tuner 41, a waveform equalizer circuit 42, an A/D converter 43, a packet extraction block 44, a program data generation block 45, a B-HTTP service block 46, a Bitcast browser block 47, etc. In this example, the B-HTTP service block 46 and the Bitcast browser 47 are provided as the Bitcast software product 48.

The tuner block 41 selects the channel of and demodulates the television signal that was modulated and transmitted. The waveform equalizer circuit 42 corrects the signal level of and disturbances in the waveform of the television signal. The A/D converter 43 samples the signal among the specified horizontal scan intervals, in 1/364 fH (horizontal scan frequency) second intervals, and generates digital information. The A/D converter 43 corresponds to the physical layer (layer 1) of the ISO reference model standardized by the ISO (International Organization for Standardization).

The packet extraction block 44 performs synchronization processing (framing processing) in bit and byte units, for the digital information sampled by the A/D converter 43. It then extracts the data packet information and detects and corrects transmission errors. The packet extraction block 44 corresponds to the data link layer (layer 2) of the ISO reference model.

The program data generation block 45 sorts and links by packet related on the transmission side, in order to generate data blocks. This program data generation block 45 corresponds to the network layer (layer 3) and the transport layer (layer 4) of the ISO reference model. Furthermore, these blocks 41–45 are structured similarly in the VBI terminal, also.

The program data blocks generated thus are supplied to the B-HTTP service block 46. The B-HTTP service block 46 processes the messages (data groups) according to the B-HTTP format explained in FIGS. 5, 6, and 7. The details will be explained next with reference to FIG. 11 and subsequent figures. The Bitcast browser block 47 displays the content information based upon the processing in the B-HTTP service block 46. This browser block 47 provides the user with an interface that resembles an ordinary browser that displays Internet WWW pages.

Figure 10:
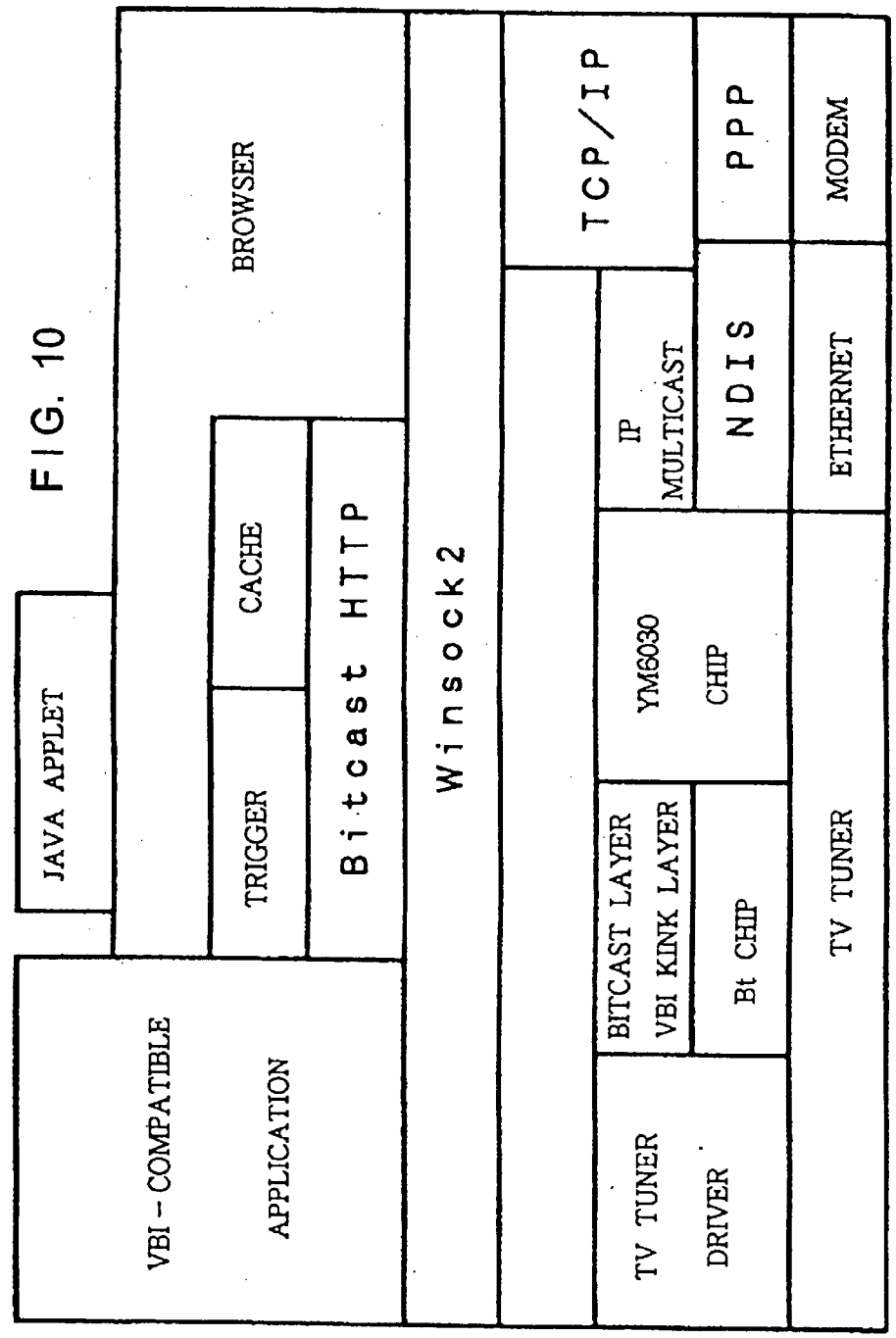
FIG. 10 is a diagram depicting a concrete example of the implementation of the configuration of FIG. 1 using a personal computer.

The relationships between the operating system and the hardware for the personal computer 20, the browser block 47, and the B-HTTP service block 46 are as shown in FIG. 9. Also, the actual implementation is as shown in FIG. 10. In the embodiment of FIG. 10, the Bitcast layer handles the functions of multicasting in the communication technologies and VBI broadcasting in one and the same layer, so the broadcasting and communication multicasting are handled identically. Also, the socket Winsock2 is expanded to handle the Bitcast layer protocol in addition to the TCP/IP protocol, so communications and broadcasting ultimately are handled at the same level.

Figure 11:
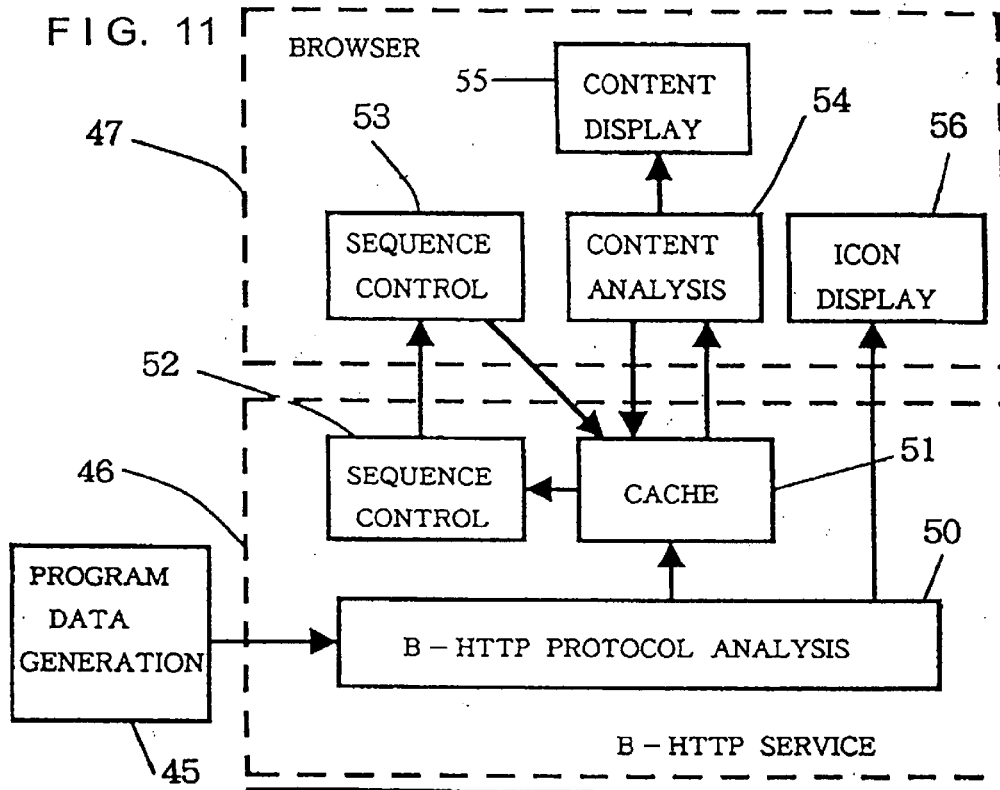
FIG. 11 is a diagram explaining a configuration example of the Bitcast browser 47 and the B-HTTP service block 46 both of FIG. 8.

FIG. 11 shows a configuration example of the B-HTTP service block 46 and the Bitcast browser block 47. In the figure, the B-HTTP service block 46 consists of a B-HTTP protocol analysis block 50, a cache 51, a sequence control block 52, etc. The B-HTTP protocol analysis block 50 analyzes the messages received from the program data generation block 45, in accordance with the B-HTTP protocol, after which it passes the results to the cache. The cache 51 stores the information received from the protocol analysis block 50. The sequence control block 52 manages the correlation between the time and contents, for the information (real-time information) that must be displayed at a predetermined time, among the information stored in the cache 51. The sequence control block 52 then monitors the contents of the cache 51 and notifies the browser of the nearest time and contents.

The browser block 47 consists of a sequence control block 53, a content analysis block 54, a content display block 55, an icon display block 56, etc. The sequence control block 53 monitors the internal timer and calls the B-HTTP service block 46 at the specified time, thereby obtaining the content message. The content analysis block 54 analyzes the obtained content message. For example, it analyzes a document described with HTML grammar, etc. The content display block 55 displays based upon the results of the analysis at the content analysis block 54. The icon display block 56 displays on the screen the icon that indicates that a message has been received.

Furthermore, the B-HTTP service block 46 controls the recording of the demodulated television signal. The recording medium 57 can be a videotape recorder, hard disk, digital video disk, etc. The details of recording control will be explained next with reference to FIG. 31.

Figure 12:
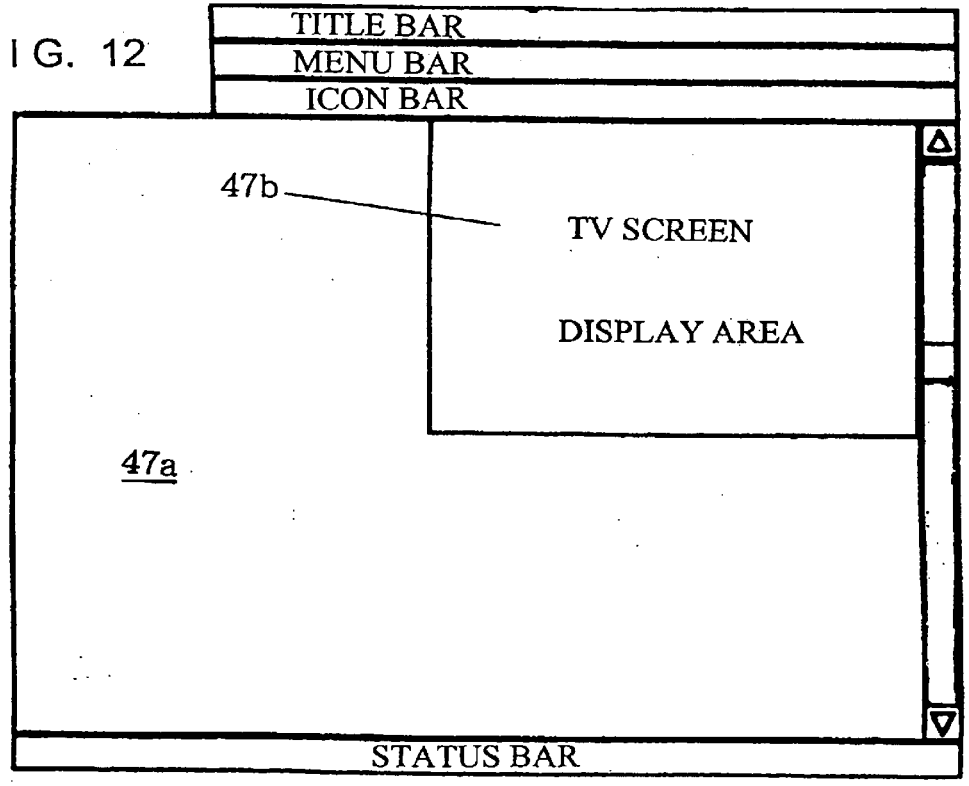
FIG. 12 is a diagram depicting an example of a screen displayed by the Bitcast browser.

The screen is displayed as shown in FIG. 12, for example. In the example, the elements displayed on the screen are a web screen 47a and a television screen 47b. The web screen 47a has the same appearance and user interface as an Internet WWW browser. The screen has the following three switchable display modes, for example:

① Television display mode, which displays a television screen in a full-screen.

② Web display mode, which displays a web screen in a full-screen.

③ Composite display mode, which displays the television screen on a part of the web screen.

When a message containing icon information is received, the corresponding icon is displayed at the bottom of the screen, for example, at the effective period start time. If the message contains content body displayed by the browser, when the icon is clicked, the content body is displayed on the web screen. If the current mode is the television display mode, the mode transits to the composite screen mode. The content body is displayed in the composite mode or the web mode, in which the web screen is displayed. Here, the user can select among the automatic update display mode and the manual display mode. In the automatic update display mode, the display of the current content message is updated with the display of the line mode content message at the time when the effective period start time newly arrived. In the manual display mode, the live mode's content messages are spooled at the time when the effective period start time arrived. The content messages are selected sequentially or by means of a dialog based upon the user's operation, and then displayed.

Next, the detailed operation will be explained with emphasis on the B-HTTP service block 46.

[Cache Index Data Structure]

Figure 13:
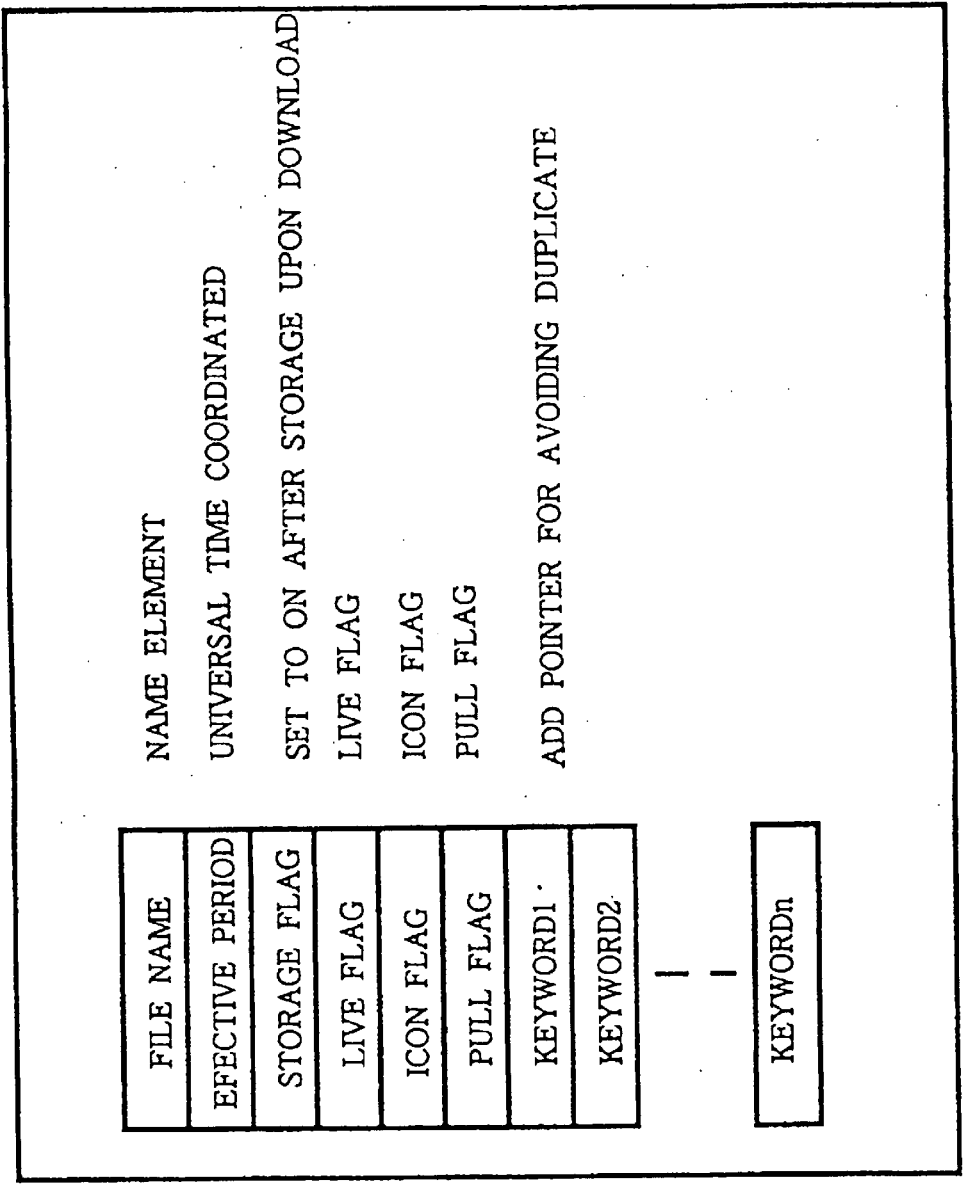
FIG. 13 is a diagram depicting an configuration example of the index elements used for message caching.

The data structure of index used to manage the received messages will be explained first. When a message is received, the message is stored in the cache (hard disk). Each message is stored as a file. Then, in order to manage the messages, corresponding index element is generated and stored in memory. The index element is shown in FIG. 13. The index element has the following fields: ① the file name (name element), ② the effective period (universal time coordinated), ③ the storage flag (set ON after storage by the download processing), ④ the live flag (which indicates whether or not the mode is the live mode), ⑤ the icon flag (which indicates whether or not an icon element is present), ⑥ the pull flag (which indicates whether or not a pull element exists), and ⑦ the keyword(s).

Figure 14:
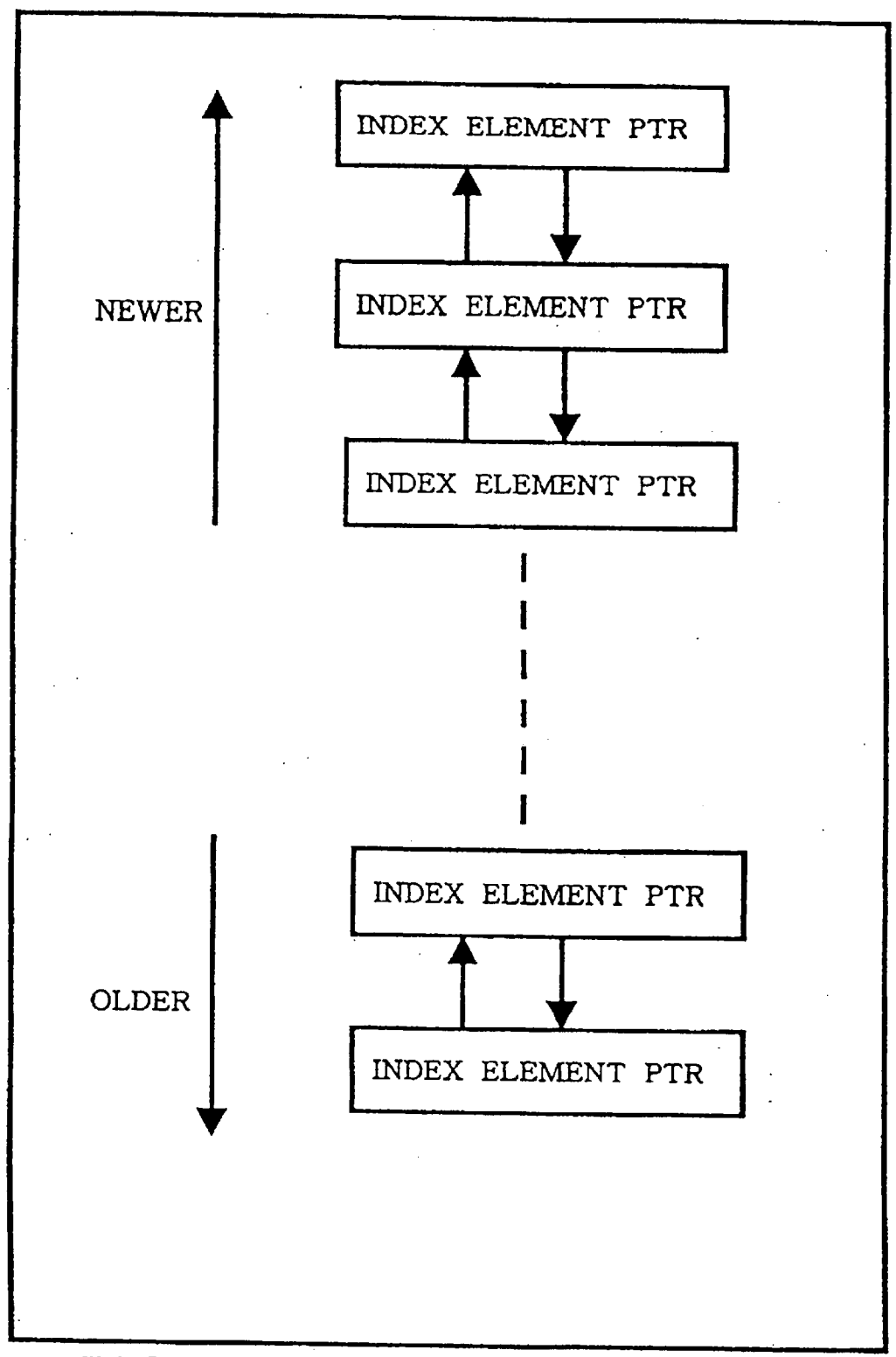
FIG. 14 is a diagram explaining the cache list that points to the index elements.
Figure 15:
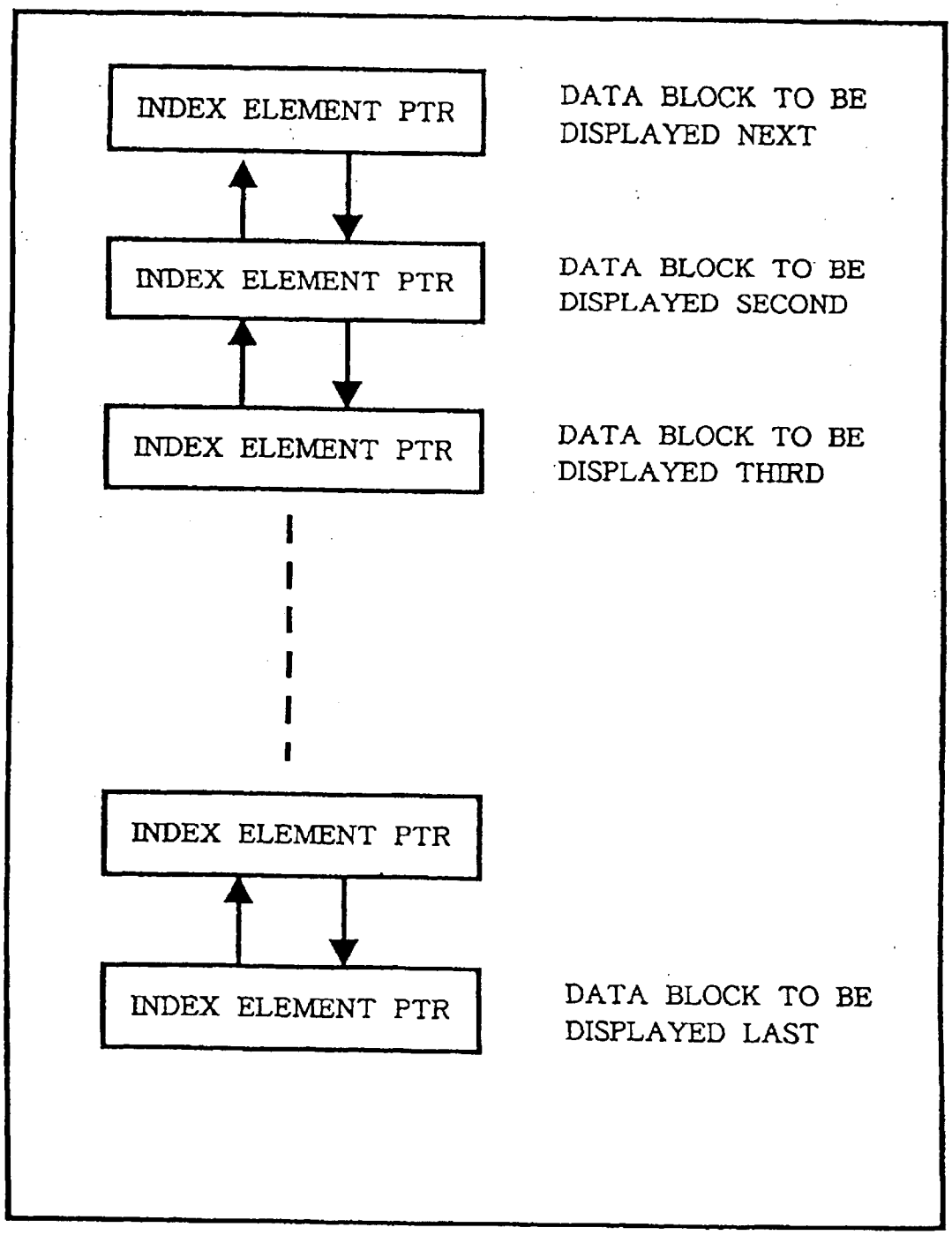
FIG. 15 is a diagram explaining the display list that points to the index elements.

The index elements are pointed to by two types of index lists, for example, and they are used for cache LRU (Least Recently Used) management and for web page and icon display management. In FIG. 14, a list is formed by using bi-directional pointers in the access order. In this manner, it is possible to manage the messages in the cache by means of the LRU method. Also, as shown in FIG. 15, a list can be formed by using bi-directional pointers in the sequence of the display timing (effective period start time). when this list is used, it is possible to retrieve messages in the display timing order and to display icons and web pages, etc. (in the live mode).

[Web Screen Display]

Figure 16:
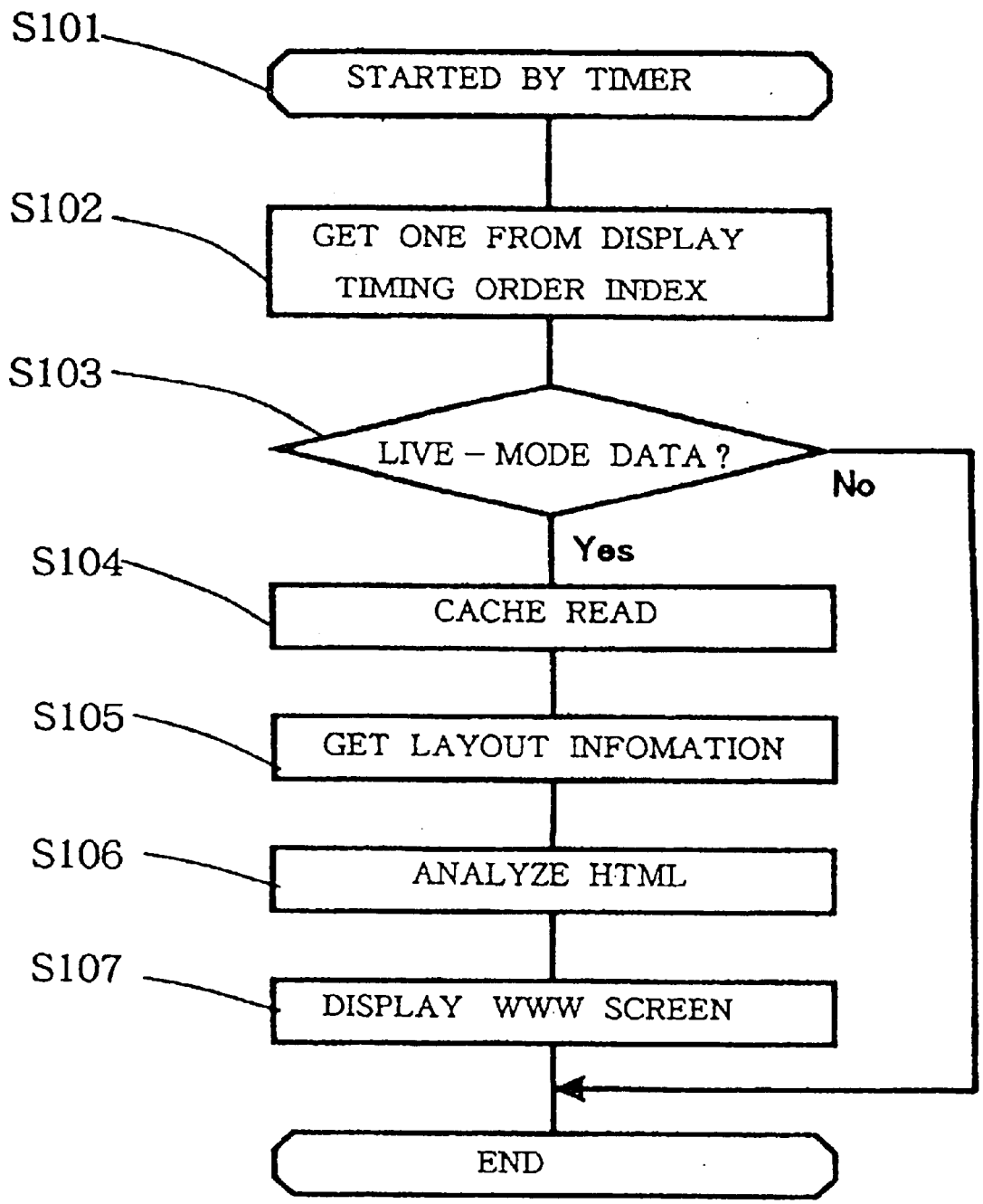
FIG. 16 is a flowchart explaining the operation of displaying a web page, etc.

FIG. 16 shows the operation that displays on the web screen the information to be displayed automatically at the specified time by the live-mode element. In this figure, the timer (not shown) starts the web display operation after referencing the effective period start time ('S' in FIG. 6) (S101). Then one index element is retrieved in the display timing order (S102), and the live flag is used to determine whether or not the mode is the live mode (S103). If the mode is not the live mode (e.g., in the event of messages for downloads), the processing flow terminates as is. If the mode is the live mode, messages are read from the cache, an HTML document is analyzed, and a web screen is displayed (S104, S106, S107).

Figure 17:
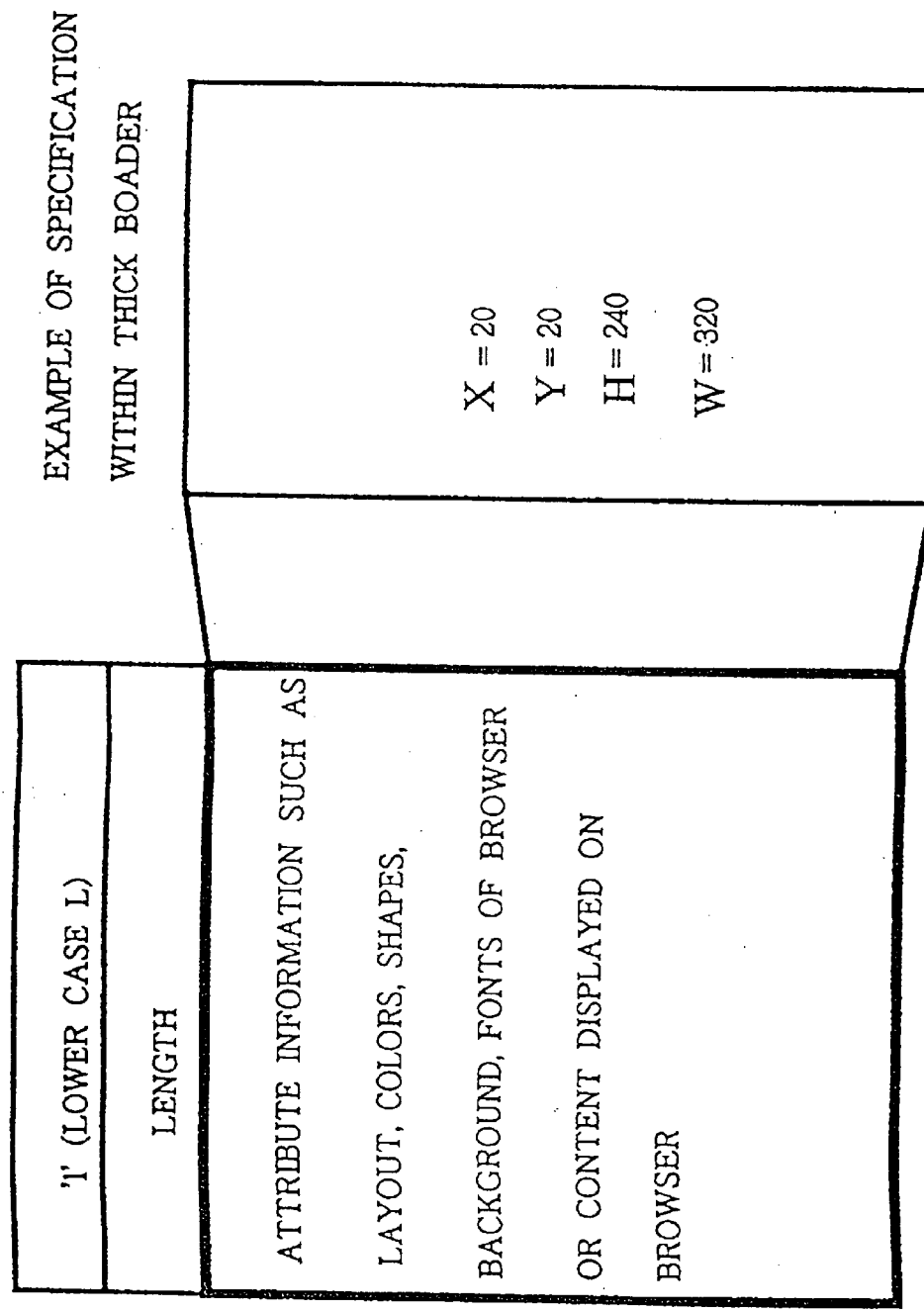
FIG. 17 is a diagram depicting an example of the layout element.
Figure 18:
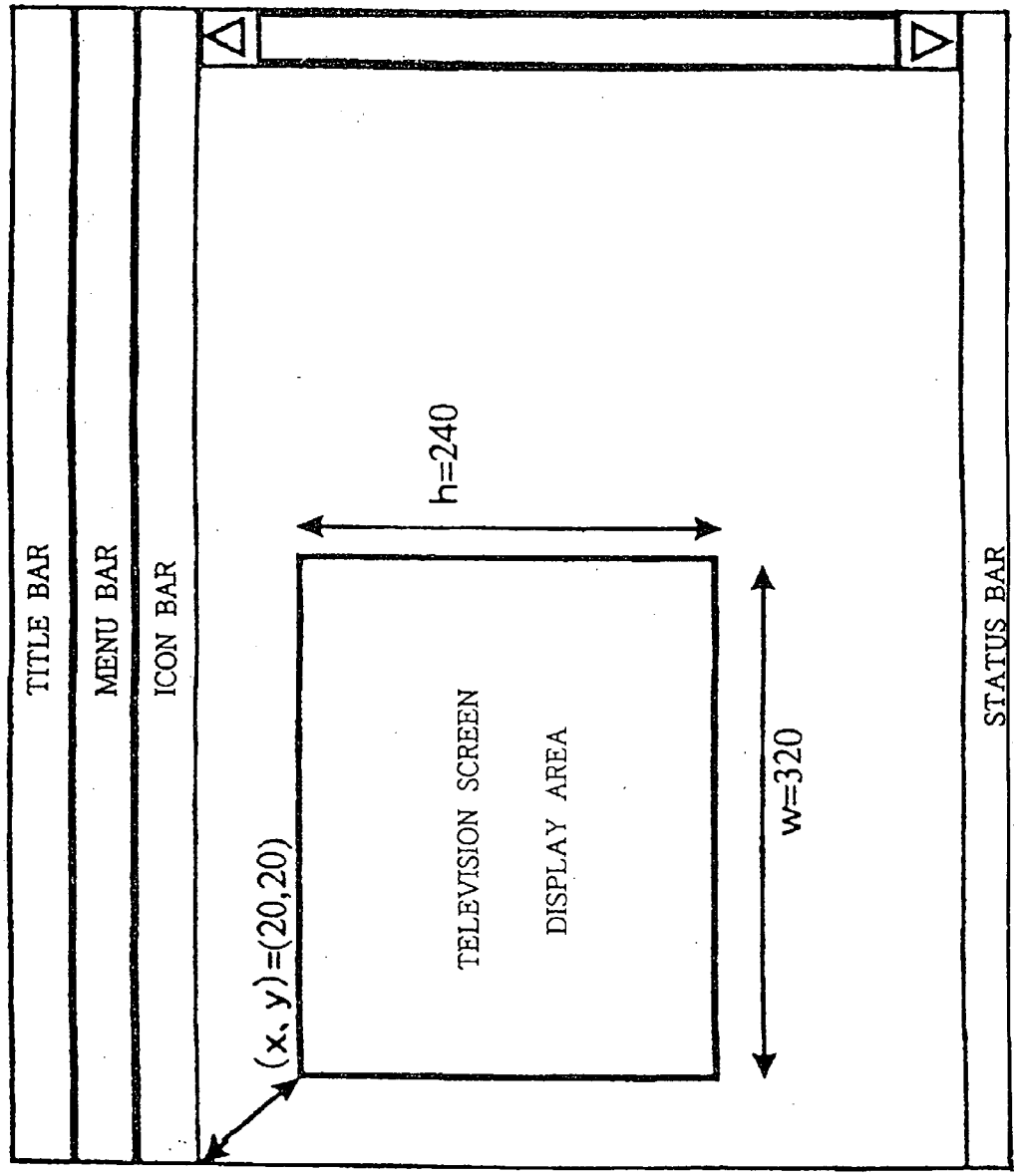
FIG. 18 is a diagram depicting the layout of the Bitcast browser corresponding to the layout icon example of FIG. 17.

At step S105, the layout information is retrieved. If there is layout information, the browser layout is modified. As shown in FIG. 17, also, the browser layout information consists of the layout, colors, shapes, background, fonts, and other attribute information for the browser itself or the contents displayed by the browser. As shown in FIG. 17, for example, the television screen displayed in the browser (in the composite display mode) can be changed to the layout shown in FIG. 18 by specifying x=20, y=20, h=240, and w=320.

[Icon Display]

Figure 19:
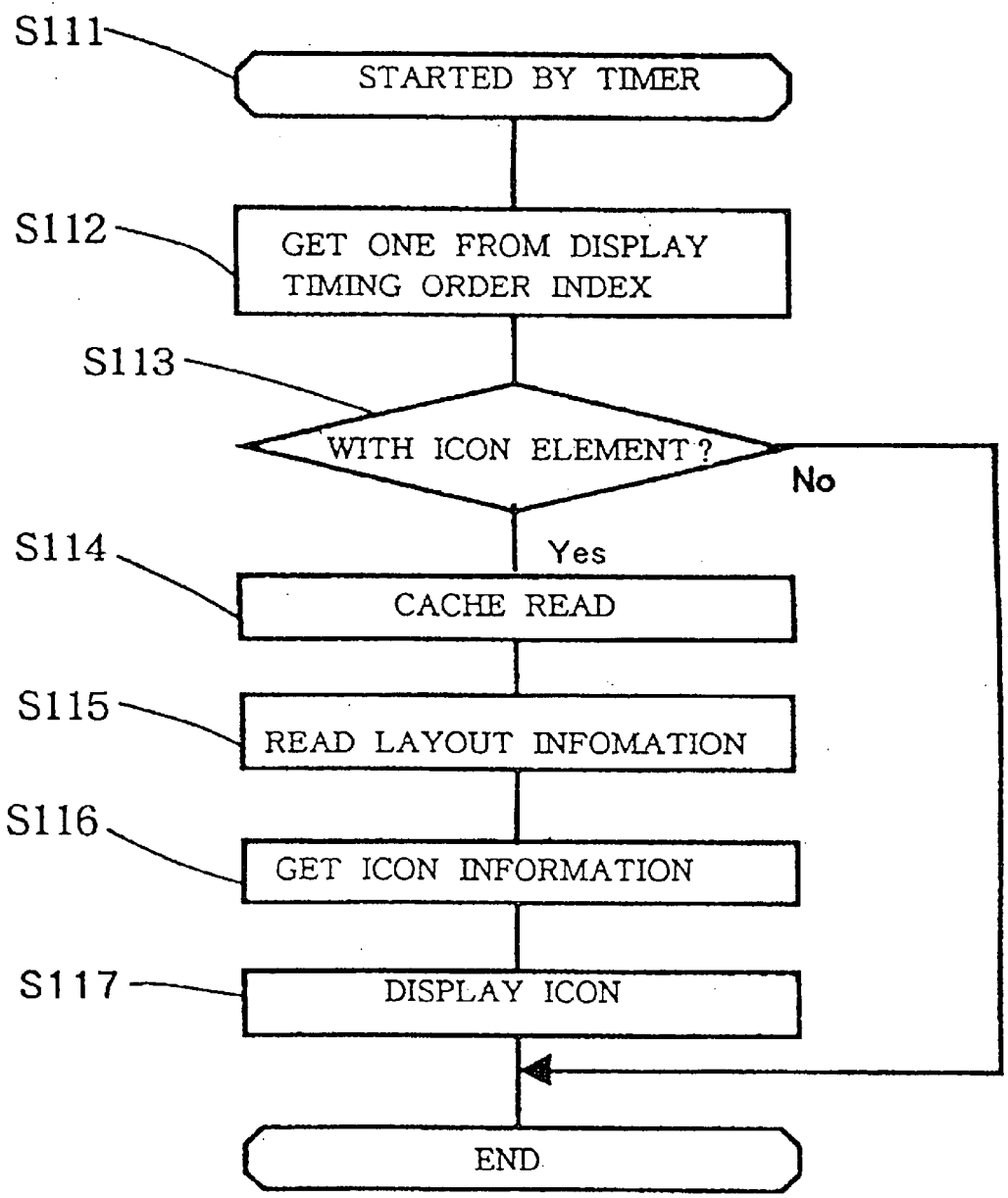
FIG. 19 is a flowchart explaining the icon display operation.

FIG. 19 shows the operation that displays an icon at the specified time. The previously explained web display is not performed if the web screen is not open. The icon to be explained here is displayed regardless of whether or not the web screen is open. In FIG. 19, the timer (not shown) starts the icon display operation after referencing the effective period start time (S111). Then one index element is retrieved in display timing sequence (S112), after which the icon flag is referenced in order to determine whether or not an icon element is present (S113). If there is no icon element, the processing terminates as is. If there is an icon element, messages are read from the cache, the icon information is retrieved, and the icon is displayed on the screen (S114, S116, S117).

Icons can be displayed in various modes and various layouts. Also, various methods can be adopted in which excessive icons disappear. They are arranged linearly in the dock area at the bottom of the screen, and they may disappear if the arrangement location fills, or the icons can be made to be selectable by scrolling, or they can be selected from multiple pages.

Furthermore, the icon layout information is retrieved in step S115, so the icon layout can be changed.

[Icon Click Processing]

Figure 20:
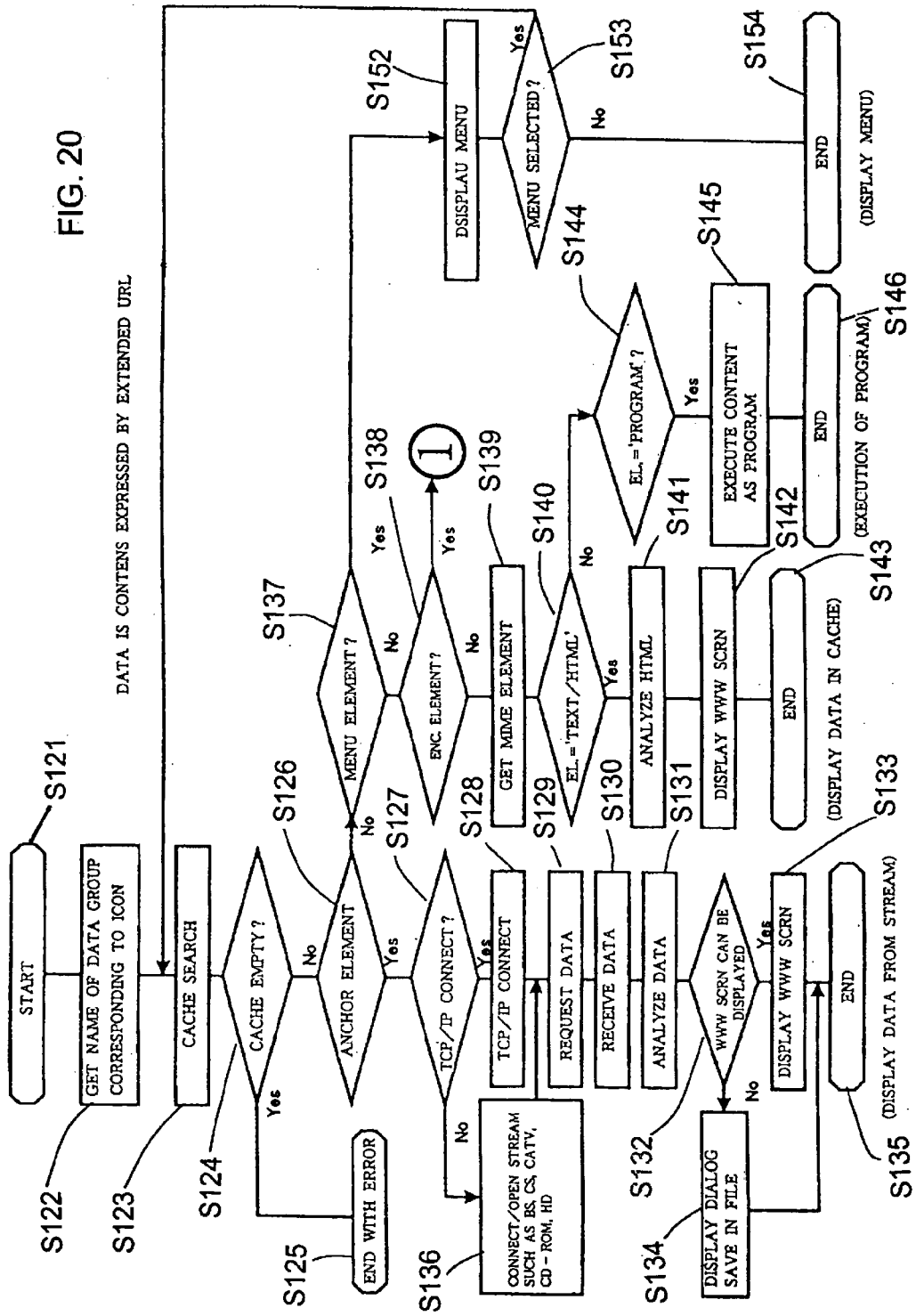
FIG. 20 is a flowchart explaining the operation after an icon is clicked.
Figure 21:
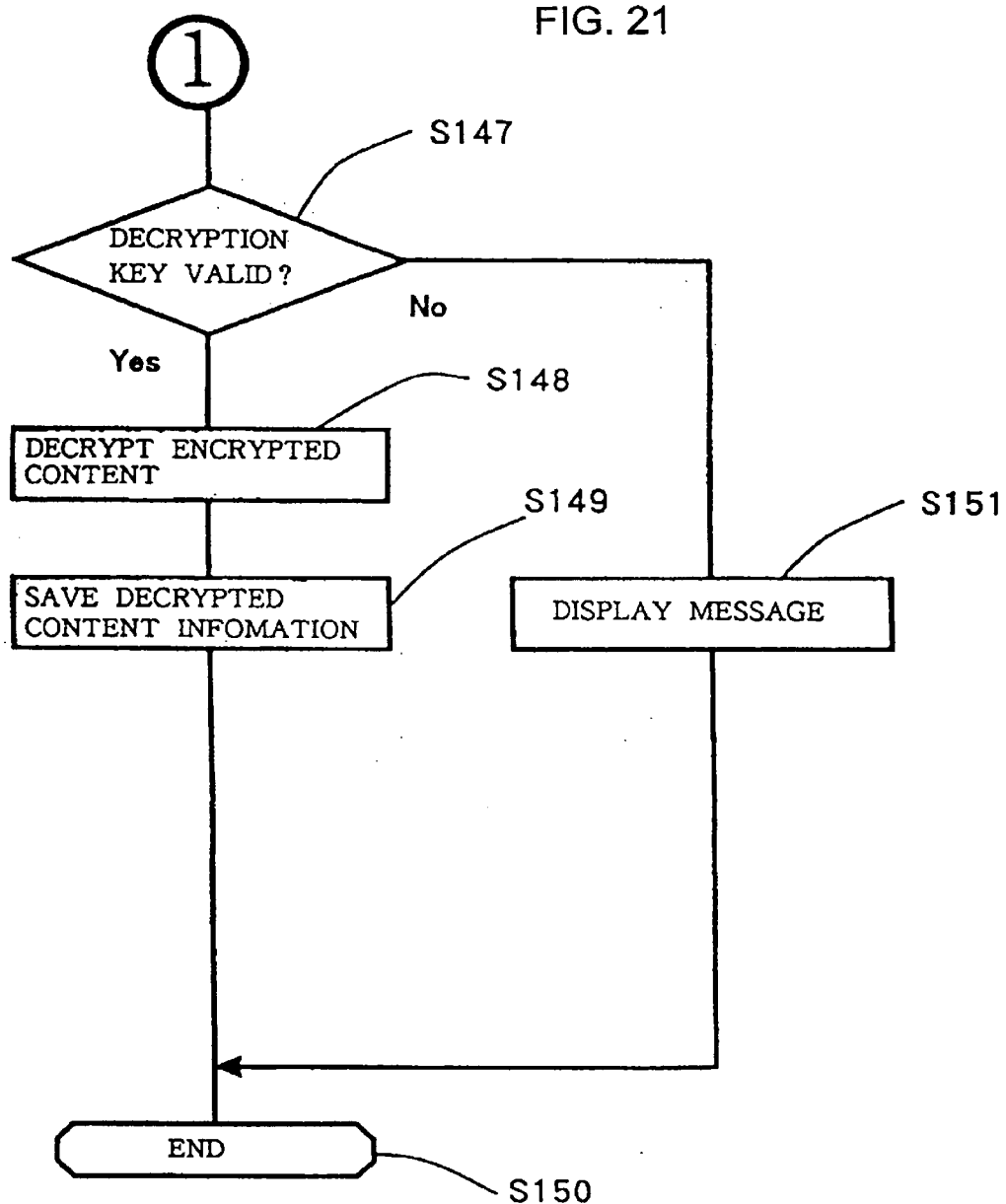
FIG. 21 is a flowchart explaining the operation after an icon is clicked.

FIGS. 20 and 21 show the operation when an icon on the screen is clicked. In FIG. 20, when an icon is clicked, the message name corresponding to the icon is retrieved, and the cache is searched (S121, S122, S123). If the appropriate message name is not in the cache, an error is returned, and processing terminates (S124, S125). If the appropriate message name is present, the processing checks whether or not there is an anchor element (S126). The anchor element specifies the data source. Data sources include an Internet server, a broadcast signal from a broadcast satellite or a communications satellite, a cable television signal from a cable television broadcast station, a CD-ROM, a DVD, a hard disk, etc.

If there is an anchor element, the processing determines whether or not the source of the corresponding data is a server on the Internet (i.e., whether or not TCP/IP connection is necessary) (S127). If the data source is a server on the Internet, the server on the Internet is accessed and information is retrieved. That is, TCP/IP connection is performed, and an HTML document (i.e., data) is requested and received (S128, S129, S130). Then the received HTML document is analyzed and displayed on the web screen (S131, S133, S135). Furthermore, in this case, the anchor element is, for example, "HTTP://www.infocity.co.jp/dirl/index.html".

In step S127, if the data source is not a server on the Internet, in other words, if it is a broadcast signal from a broadcast satellite or a communications satellite, a cable television signal from a cable television station, a service that uses a wire, a CD-ROM, a DVD, a hard disk, etc., connection is made to the stream of for example the broadcast signal from a broadcast satellite or a communications satellite, a cable television signal from a cable television station, a CD-ROM, a DVD, a hard disk, or the stream is opened, and processing then proceeds to step S129. Furthermore, at step S132 a decision is made as to whether or not it can be displayed by the browser. If it cannot be displayed, a dialog is displayed, and it is stored in a file (S134). Furthermore, in the event of such a data source, the anchor element is, for example, "HTTP://bitcast/BS11/filename.html". According to the source identifier of the medium (data source) corresponding to the directory (e.g., BS11for channel 11 of a BS satellite), the device is driven and the data are retrieved.

Information from a cable television's wire broadcast signal or from the broadcast signal from a broadcast satellite or a communications satellite (i.e., from the data source) may be the information transmitted in the main broadcast program, and it may be information multiplexed with this broadcast program.

On the other hand, if there is no anchor element, the menu element and the encryption element are checked. Here, processing related to the menu element will be explained, and processing when there is an encryption element will be discussed later. If there is a menu element, the menu is displayed (S137, S152). When a menu item (icon) is selected, processing resumes at step S123. If a menu item is not selected, processing terminates (S154). The menu can be used to perform detailed selection. For example, when an icon represents an advertiser, the menu can be used to display individual produces. It is also possible to display the menu in multiple levels.

At step 137, if there is no menu element, the processing checks whether or not there is an encryption element. If there is no encryption element, the data block's MIME element is obtained, and the type of content body is checked (S139). If the element is "text" or "html," it is analyzed as an HTML document and displayed on the web screen (S140–S143). If the element is "program," the content body is executed as if it were a program (S144–S146).

[Fee-Based Broadcasting)]

Before the processing in the event of an encryption element is explained, the design of fee-based broadcasting implemented utilizing the encryption element will be explained briefly. Here, the fee-based part is the content information. This is regardless of whether or not the main broadcast itself is fee-based.

Figure 22:
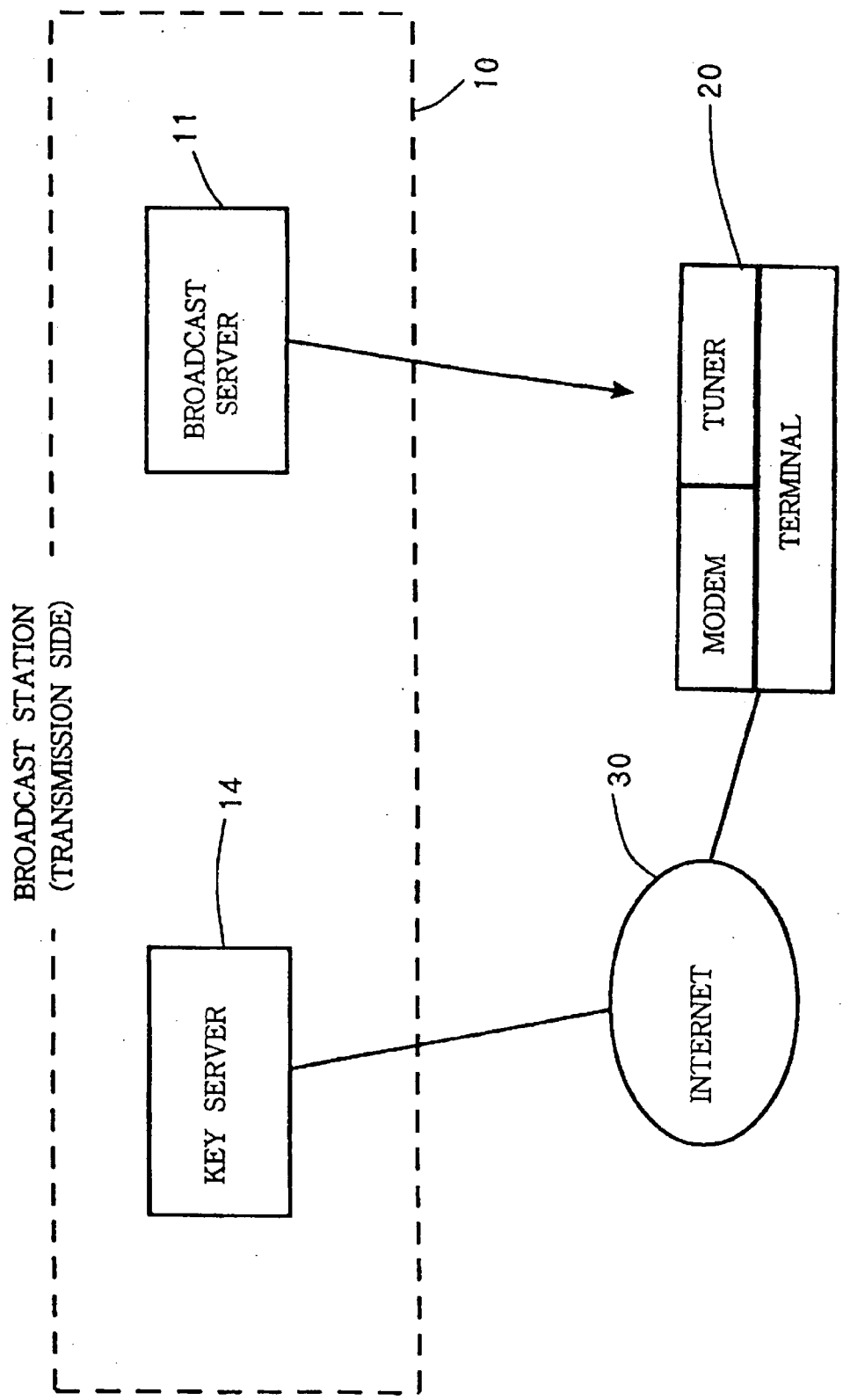
FIG. 22 is a block diagram explaining the configuration of pay broadcasting.

In FIG. 22, in the broadcasting station 10, the key server 14 is provided in addition to the broadcast server 11. The user's personal computer 20 and the key server 14 can be dialed up and connected via the Internet 30.

In order to utilize fee-based broadcasting for content information, it is necessary to contract with the administrative system of a broadcasting station, etc. After entering into a contract, the user obtains a user ID and a password. The user ID and password are applied for by means of a method specific by the administrative system (e.g., by letter, electronic mail, facsimile, web), and the user is notified of the user ID and the password by the same method.

Furthermore, in order to unprotect protected data transmitted by means of a fee-based broadcast, it is necessary to obtain unprotection information (i.e., key information). The key information can be obtained from the key server 14, via a TCP/IP connection. The user ID and password are required to obtain the key information.

Also, the log of the usage of the key information by the user is stored in the personal computer 20, and the key server 14 side is notified of the log at fixed intervals, and the charge is calculated based on that log. The routine for notification regarding information concerning the use of the key information by the user may be activated automatically by the user side or the key server 14 may poll the user side.

[Check of the Key's Valid Period]

Figure 23:
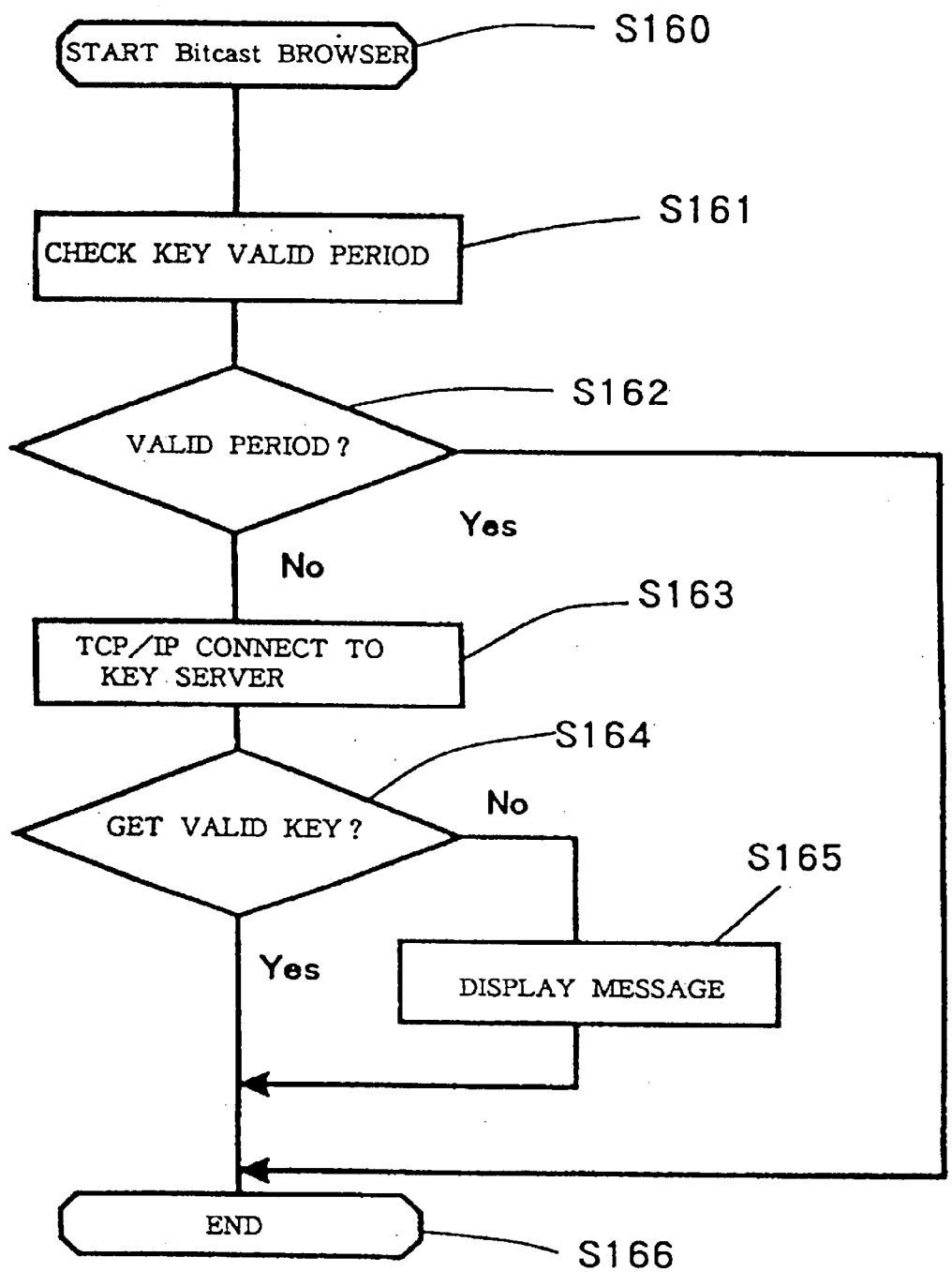
FIG. 23 is a flowchart explaining the modification of keys for the pay broadcasting.

When the browser is started up, the current validity of the key information is checked. If necessary, it is possible to obtain valid key information via the Internet. FIG. 23 shows this processing. In FIG. 23, when the browser is started up, the valid period of each key that is registered as in-use is checked (S160, S161). In order to check, the valid period of each key that is registered as in-use is stored. If the key information is still valid, the processing terminates as is (S162, S166). If it is not valid, the procedure for obtaining a key is executed after the establishment of a TCP/IP connection to the key server 14 (S164, S166). If, for some reason, a valid key cannot be obtained or is not obtained, a message to that effect is displayed and processing terminates (S165, S166).

[Decryption by Means of the Encryption Element]

The unprotection of protected content will be explained next. In step 137 of FIG. 20, if there is an encryption element, processing proceeds to step S147 in FIG. 21. That is, it checks the validity of the key information for releasing protection (e.g., scrambling and encryption that specifies the encryption element) (S147). If the key information is valid, the protected (e.g., encrypted) content is unprotected and stored (S148, S149, S150). If the key information is invalid, the reason is displayed to the user and processing terminates (S151). The encryption element can be used to specify any one of multiple protection techniques and to deal with multiple protection methods from multiple data suppliers.

[Updating the Cache Index]

Figure 24:
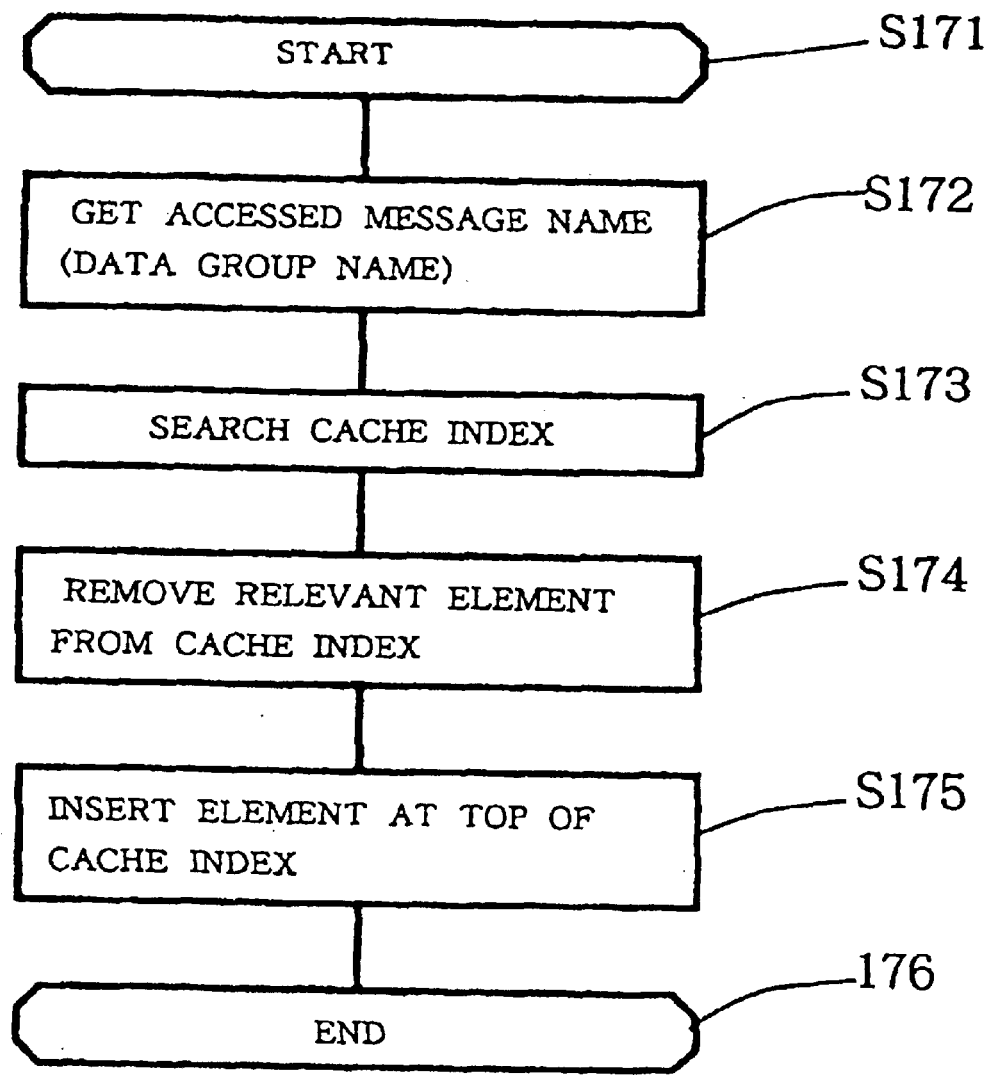
FIG. 24 is a flowchart explaining the modification of the cache index list of FIG. 14 after a message is accessed.

FIG. 24 shows the processing for updating the cache index after a message is accessed. In this manner, it is possible to maintain LRU-method cache management data. In FIG. 24, when a message is accessed, the name of the accessed message is obtained (S171, S172). Then the cache index of the list in FIG. 14 is searched, and the appropriate index element is moved to the top position (S173–S176).

[Operation during data Reception]

Figure 25:
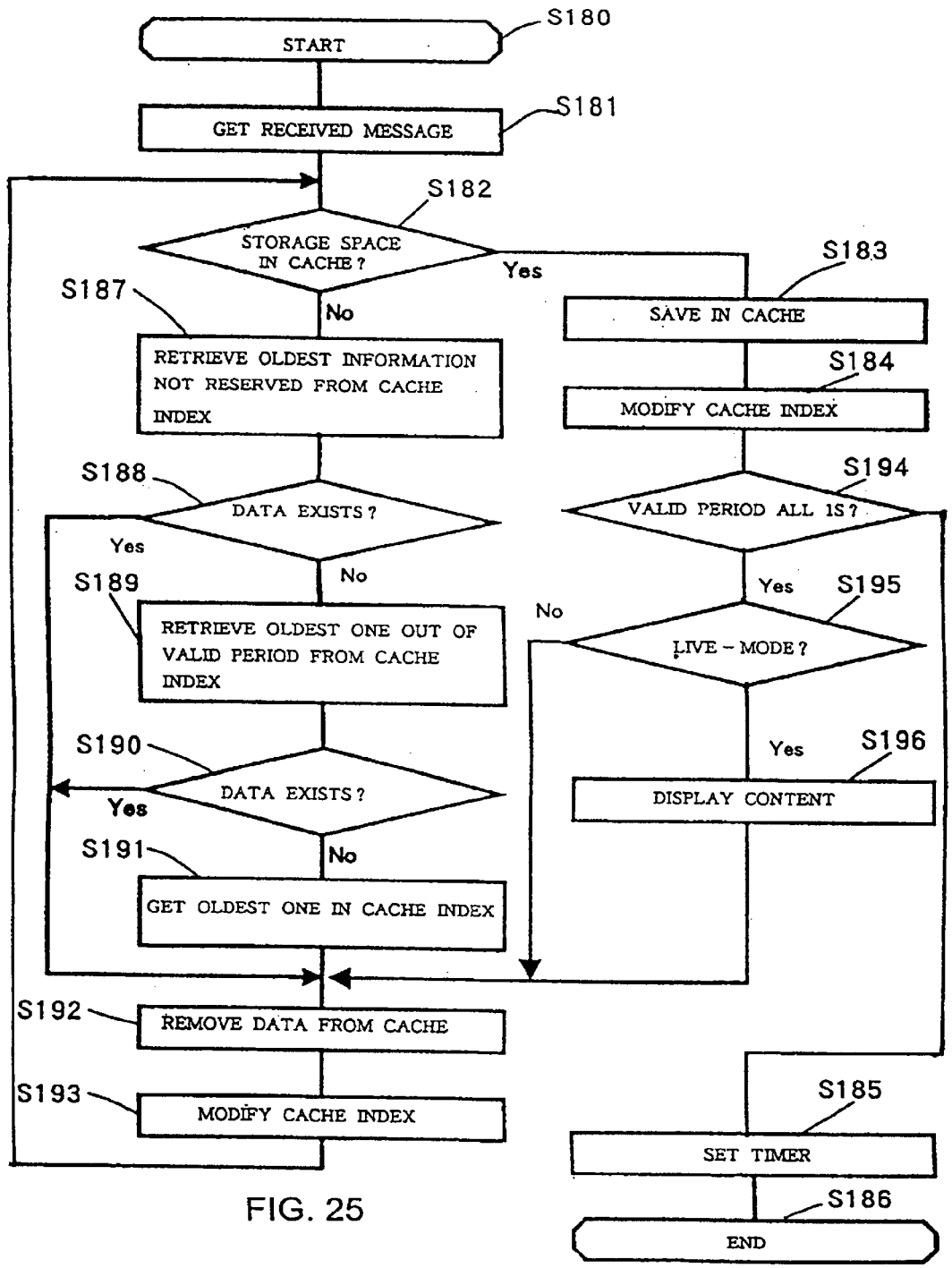
FIG. 25 is a flowchart explaining the operation during message reception.

FIG. 25 shows the operation during data reception. In this figure, when a message is received, the cache is checked for storage space (S180–S182). If there is storage space, it is stored in the cache, the cache index is updated, the timer is set, and processing ends (S183–S186, S194).

Furthermore, step 194 determines whether or not the effective period element is "ALL1". That is, it determines whether or not there is a flag that indicates that data will be deleted forcibly from the cache. In the case of "ALL1" (i.e., when the flag has been set in order to forcibly eliminate data from the cache), and the mode is checked to determine whether or not it is the live mode. If the mode is live mode, the contents are displayed, after which the data are deleted from the cache (S195, S196, S192). If the mode is not live mode, the data are deleted immediately from the cache (S195, S192). This prevents the cache from filling with cached unnecessary data.

In step S182, if the cache lacks storage space, data blocks are deleted according to prescribed rules. First, the oldest information that does not apply to the reservation target (e.g., a message to be downloaded that contains a user-specified keyword) is sought from the cache index (S187). If the information is relevant, the message is deleted from the cache, and the cache index is updated (S192, S193). If it is not relevant, the oldest expired message is sought using the cache index (S189, S190). If it is relevant, the data are deleted, and the cache index is updated (S192, S193). If there is no invalid message, the oldest in the cache index is retrieved, the data are deleted from the cache, and the cache index is updated (S190–S193).

After as many old messages as necessary are deleted thus, the new messages are stored (S183–S186).

In the cache management, it is possible to clip the (reservation) message corresponding to the user-specified keyword.

Furthermore, although data are received via the tuner 41 in FIG. 8, it is also possible to acquire data from such other media as BS broadcasts, CS broadcasts, cable television broadcasts, and recording devices. In this case, if new B-HTTP elements, which are used to switch data sources so that data from other media are acquired, are designed, data acquisition can be triggered by multiplexing in the B-HTTP broadcast signal the B-HTTP elements for switching. The acquired data are received as in FIG. 25, after which the data are displayed, etc.

[Retrieval and Display]

Figure 26:
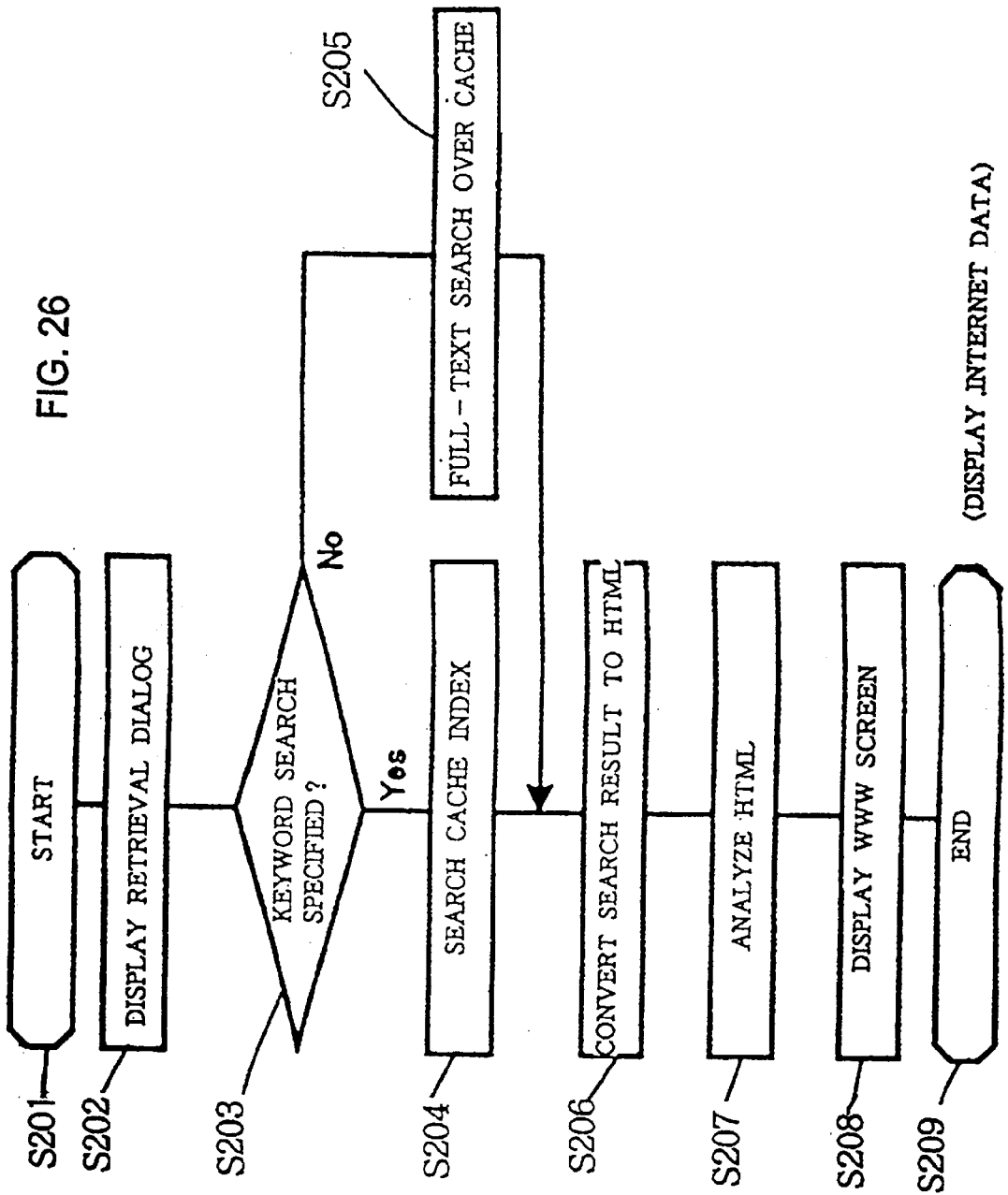
FIG. 26 is a flowchart explaining the search operation.

FIG. 26 shows the operation that searches and displays a message. In FIG. 25, when retrieval is specified, the retrieval dialog is displayed (S201, S202). If a keyword search is specified using this dialog, the cache index is searched, and the search result list is converted to an HTML document (S203, S204, S206). Also, if a keyword search is not specified, the cache's data blocks are subjected to a full-text search, and the search results list is converted to an HTML document (S205, S206). The HTML document obtained thus is analyzed and displayed on the web screen (S207–S209).

[Download]

Figure 27:
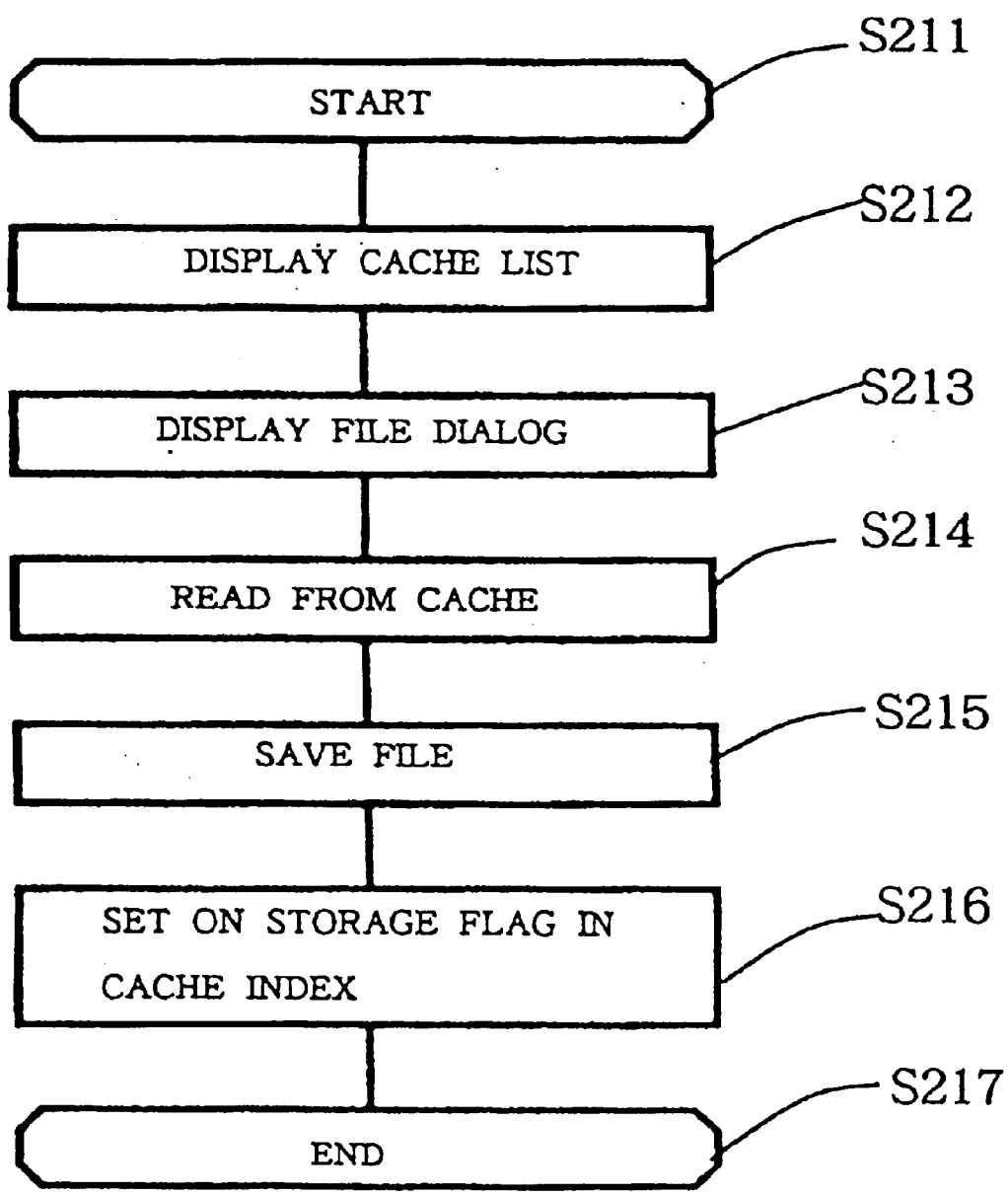
FIG. 27 is a flowchart explaining the operation during a download.

FIG. 27 shows the operation that downloads received data blocks. The download itself is an ordinary operation. First, a list of all or part of the messages in the cache is displayed, the file dialog is displayed, and download instructions are received, after which the messages are read from the cache and stored in a file (S211–S215). Then the storage flags for the index elements of the data blocks stored in the file are changed to ON, indicating that the relevant data blocks may be deleted (S216, S217).

[Operation after a Button Click]

Figure 28:
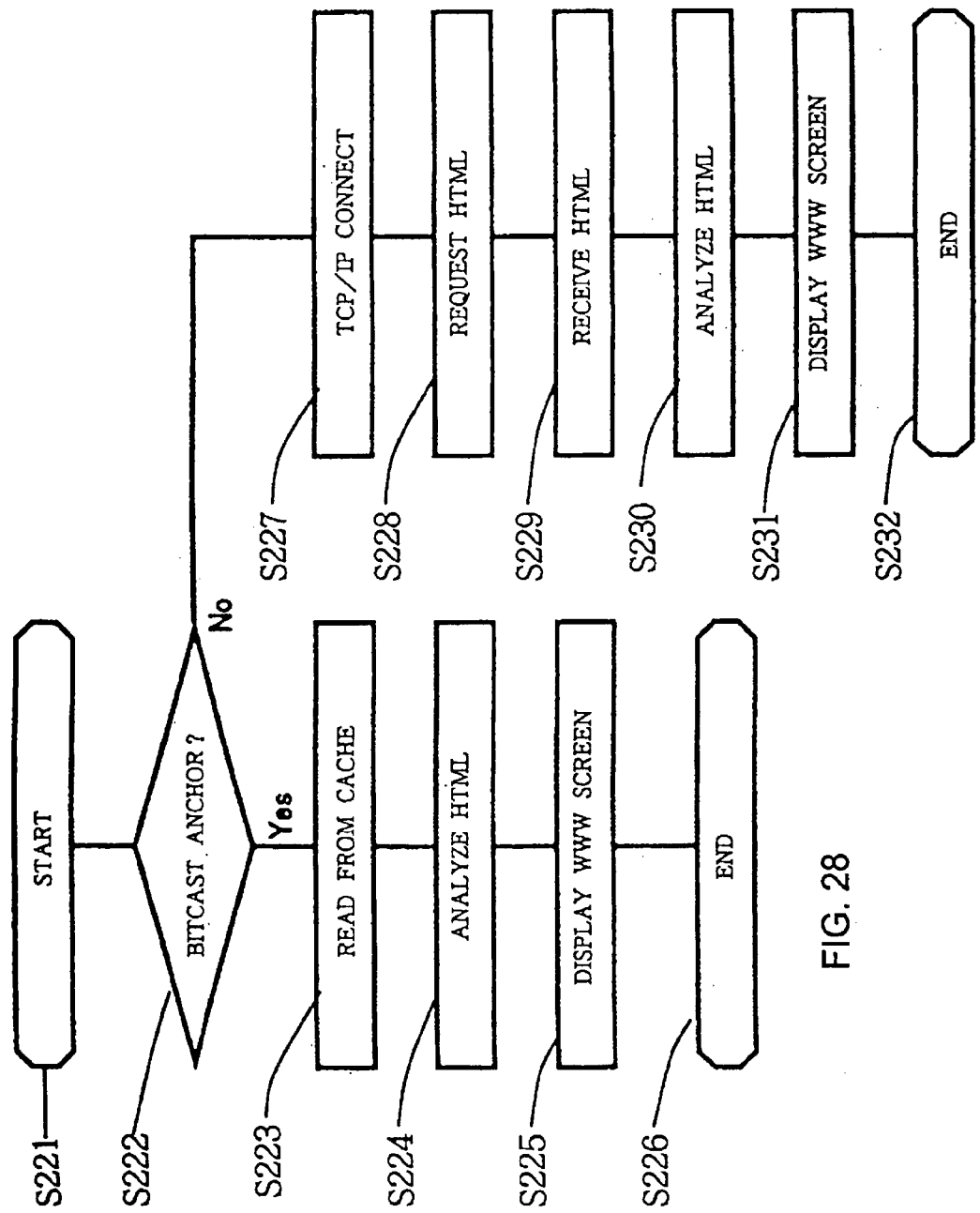
FIG. 28 is a flowchart explaining the operation during a web page button click.

FIG. 28 shows the operation for accessing a corresponding page to a click operation to a web page button. The button click triggers a check of whether or not the information corresponding to the button is a Bitcast anchor (S221, S222). If it is not a Bitcast anchor, a server on the Internet is accessed in order to retrieve the information. That is, a TCP/IP connection is established, and an HTML document is requested and received (S227, S228, S229). Then the received HTML document is analyzed and displayed on the web screen (S230, S231, S232).

Furthermore, in this case as in the case of FIG. 20, information may be obtained from such sources the broadcast signal from a broadcast satellite or a communications satellite, cable television's wire broadcast signal, a CD-ROM, a DVD, a hard disk, etc., in addition to the server on the Internet. In this case, steps S227–S232 should be replaced by steps S127–S136 in FIG. 20. The detailed explanation will not be repeated.

On the other hand, in the case of a Bitcast anchor, messages are read from the cache, and the HTML document is analyzed and displayed on the web screen (S223–S226).

[Program Reservation Operation]

Figure 29:
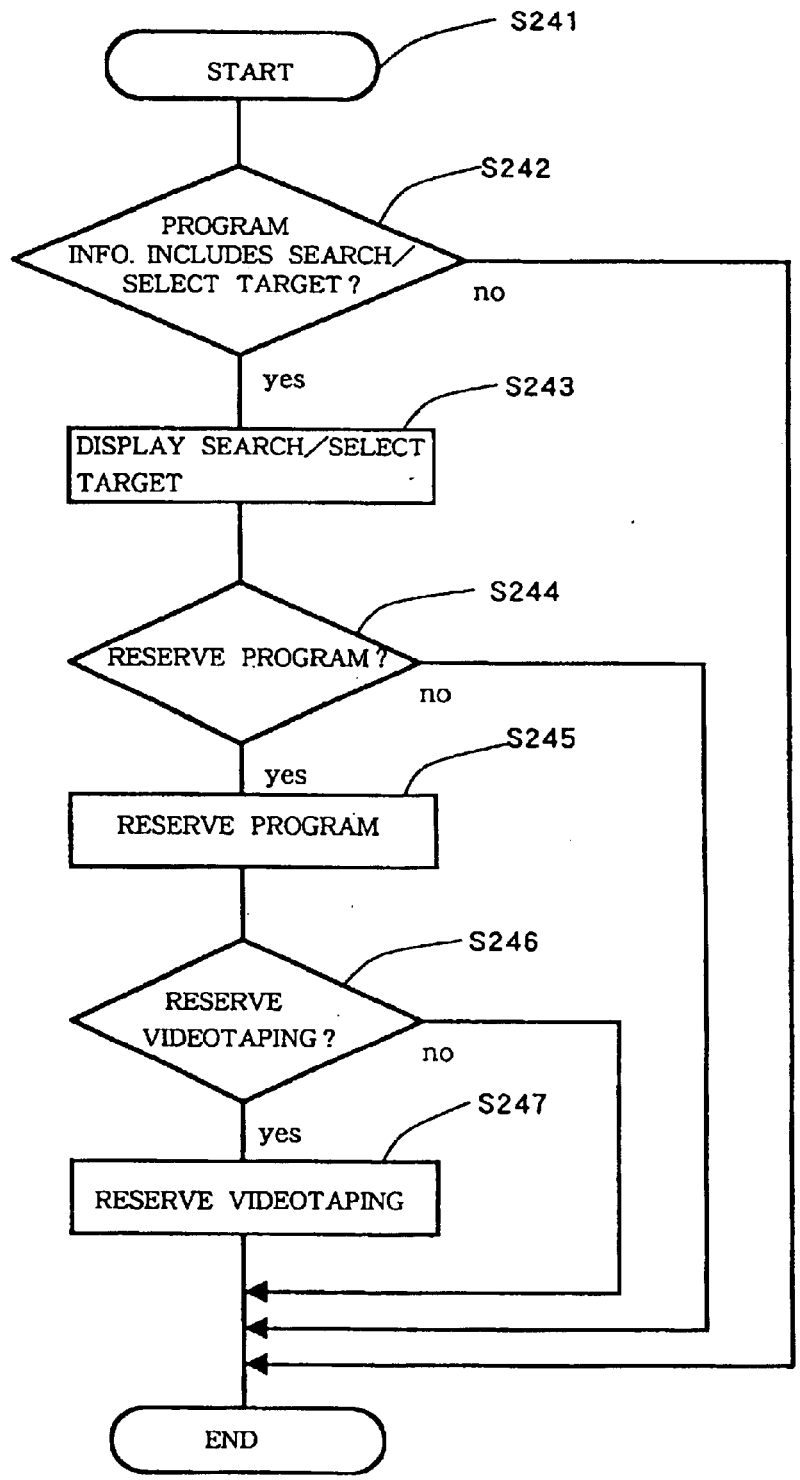
FIG. 29 is a flow chart showing the operation of reserving a program.

FIG. 29 shows the operation when reserving a program. (The program information transmitted by means of the program element is stored in the designated storage location. The program information can be displayed by clicking the specified button for program reservation and selecting from the menu.) The program information can be displayed in a listing form, for example. In FIG. 29, if program information reservation is initiated by clicking a button, etc. (S241), the processing determines whether or not there is a search or selection target in the program information (S242). If there is no target, the program reservation operation terminates. If there is a target, a listing of the broadcast programs that were searched for or selected is displayed (S243). Various display modes are adoptable. If the displayed listings contain no program that the viewer wants to reserve, the reservation operation is discontinued according the user operation, and the reservation operation terminates. If there is a program that the user would like to reserve, the user performs the selection operation in order to reserve the program (S245). In this case, the program is searched for using the search function, after which the program may be reserved. After the program is reserved, the user optionally can also reserve videotaping (S246). By specifying the videotaping reservation, the videotaping of the program for which the channel was selected and a reservation was made is reserved (S247). If videotaping is not reserved, the processing is terminated according to the user's operation.

[Channel Selection and Videotaping by Means of a Reservation]

Figure 30:
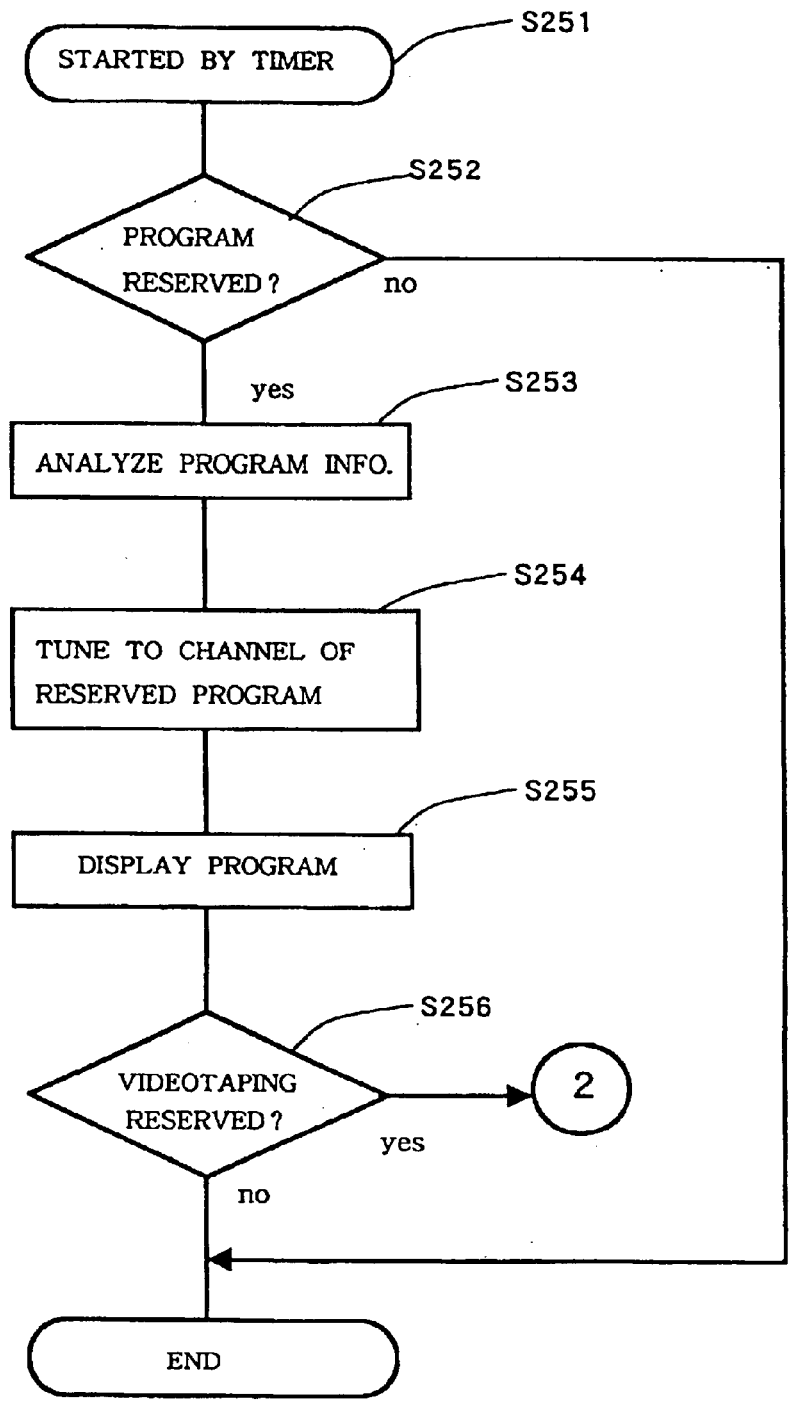
FIG. 30 is a flow chart showing the operation of channel selection and video taping of FIG. 29.
Figure 31:
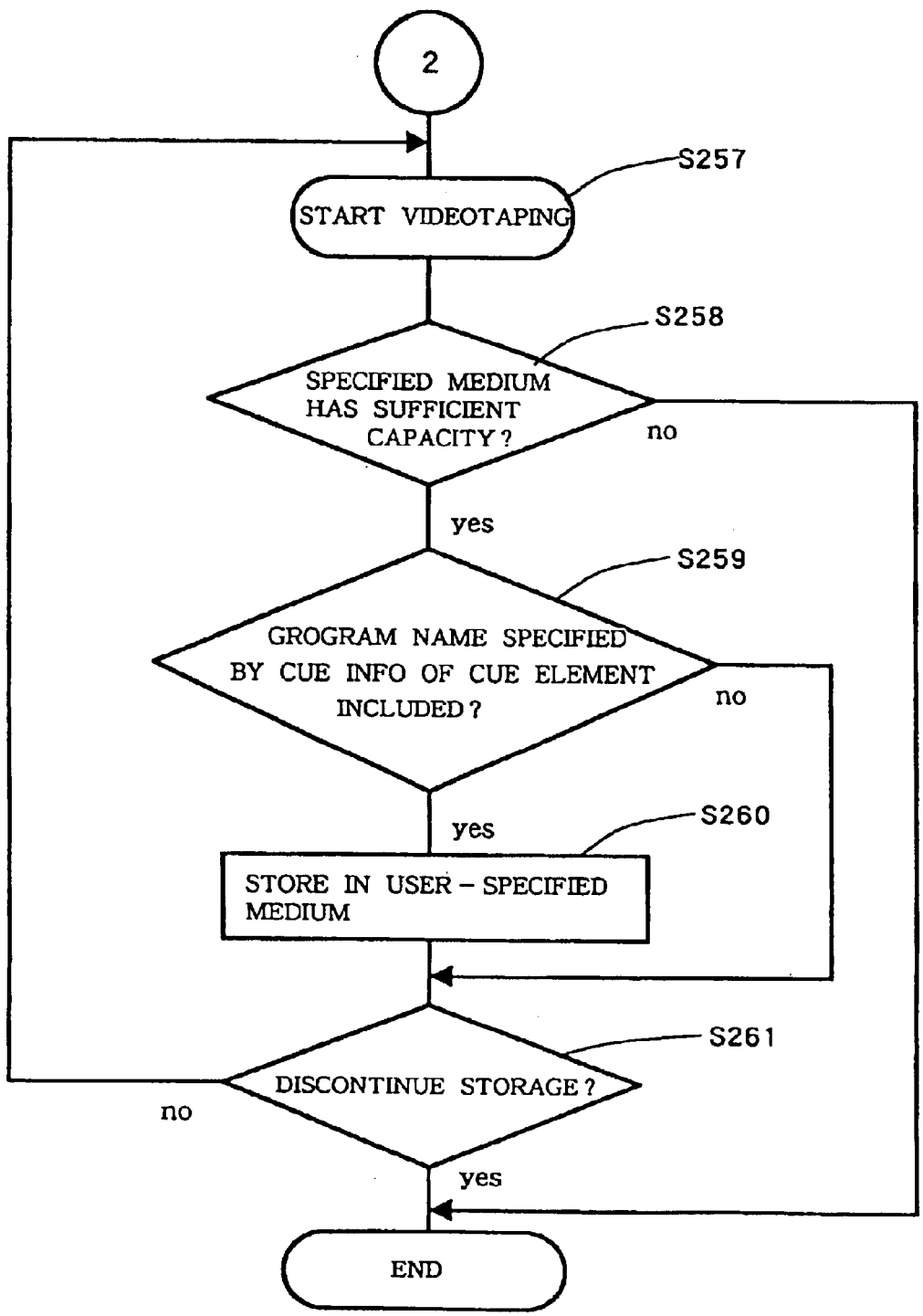
FIG. 31 is a flow chart showing additional steps of the operation illustrated in FIG. 30.

The operations of channel selection and videotaping reserved in FIG. 29 will be explained next. FIGS. 30 and 31 show the operation of this channel selection and videotaping. In FIG. 30, step 251 initiates the checking of whether or not there is a reservation. If a program is reserved (S252), the program information is analyzed (S253), tuning (channel selection) for the program reserved based upon the analysis result is performed, and the program is displayed on the screen (S254, S255). If no program is reserved, processing is terminated as is (S252). After program tuning is performed at step S255, the processing checks whether or not videotaping has been reserved (S256). If videotaping has been reserved, processing transits to the operation of FIG. 31. If videotaping has not been reserved, the operation of FIG. 31 is not performed.

In FIG. 31, videotaping is started if videotaping has been reserved (S257). That is, first, the capacity of the specified medium 57 is checked to determine whether or not it is sufficient (S258). As mentioned, the medium 57 can be a hard disk, digital video disk, videotape recorder, etc. According to the medium, the recording operation varies and the capacity checking method also varies. If the specified medium's capacity is insufficient, processing is terminated without videotaping. If the specified medium's capacity is sufficient, videotaping is started after the arrival of the cue element for the program to be videotaped. That is, the processing checks whether or not the program for which videotaping was specified is contained in the cue information of the arrived cue element (S259). If it is contained, videotaping is performed on the user-specified medium (S260). If the program for which videotaping was specified is not contained in the cue information of the cue element, processing proceeds to step 261, where it is determined whether or not the user specified the discontinuation of the videotaping process. If the user specified discontinuation, processing is terminated. If discontinuation processing is not performed, the processing resumes from step S259.

When the program is stored in the medium, also, the existence of the user's discontinue instruction is monitored. When discontinuation is specified, processing is discontinued (S261).

Thus, videotaping is not started until the arrival of the cue element for the program for which videotaping was specified, so it is possible to videotape precisely even if, for some reason, the program's broadcast is postponed. Naturally, the videotaping end time can also be shifted according to the arrival time of the cue element.

[Automatic Capture of Data by Means of the Pull Element]

FIG. 32 shows the operation for the automatic capture of data by means of the pull element. In FIG. 32, when the browser display starts, the processing determines whether or not there is a pull element for the displayed content body (S271, S272). That is, it checks for the presence of the pull flag by referencing the index element of FIG. 13. If there is no pull element, nothing happens. On the other hand, if there is a pull element, the processing determines whether or not it is necessary to establish a TCP/IP connection by referencing the URL of the pull element (S273). If the URL specifies an external server, the processing determines that a TCP/IP connection is necessary, the TCP/IP connection is established, and the data are acquired (S274, S276). On the other hand, when the URL specifies the stream from the tuner for a BS, CS, CATV or a recording device such as a CD-ROM, hard disk, etc., a connection with the corresponding stream is established or the stream is opened, and data are acquired from the relevant stream (S275, S276). The data acquired thus are displayed in the browser.

Furthermore, the embodiment is one example and various modifications are possible. For example, although a personal computer was used as the user-side terminal in the embodiment, it could also be an intelligent television receiver, set-top box, etc. The SECAM and PAL television broadcast formats could be used in addition to the NTSC format. Also, it is not restricted to television broadcasting, but could also be applied to radio broadcasting. Also, the television broadcasting is not limited to ground wave broadcasting; satellite broadcasting could be used. Also, various multiplexing methods could be applied, and frequency multiplexing, etc., could also be applied. Also, other types of elements could be used as the B-HTTP element.

Also, in the embodiment, the broadcast signal received by the personal computer is recorded by means of a videotape recorder, hard disk, digital video disk, etc. However, the structure may also be such that the videotape recorder itself retrieves the cue element and, based thereupon, delays the recording timing.

The structure may also be such that the cue element contains the recording start time, the shift time, etc., and the recording timing is delayed accordingly.

It is also possible, without involving the content body, to generate, multiplex, and then transmit a pull element, and after receiving the pull element, automatically to retrieve the pull element and display on the screen the content information based upon such information as the pull element's URL.

In the preceding explanation of the embodiment, the HTML file was multiplexed in the television signal together with the B-HTTP element. However, it is also possible to directly broadcast the HTML file, video and audio files, data files, etc., or to perform multicasting communication and broadcast communication. Before transmission, the following information may be added to the files: the control information that controls the display timing (the trigger signal may be transmitted during display), other content source information, cache information, layout information, data protection information, icon information, data automatic retrieval (pull) information, program reservation information, and control information (e.g., program display and videotaping time adjustment information). In this case, for example, files containing control information are received at the, device 20a (tuner for BS broadcasts, CS broadcasts, cable television broadcasts, data broadcasts) in FIG. 1, and the file contents are displayed, etc., based upon this control information.

This concludes the concrete explanation of the embodiment.

The technical features of the embodiment will be summarized next.

(1) Specification of Display Timing

According to the first technical feature of the present embodiment, the information transmission and display method comprises the steps of: multiplexing in a broadcast signal, content information and information regarding timing for displaying the content information on a display device; transmitting the multiplexed broadcast signal; receiving the multiplexed broadcast signal; extracting the content information and the timing information from the multiplexed broadcast signal; and displaying at least a part of the content information on the display device, based upon the timing information.

In this configuration, it is possible to display content or a part thereof at the desired time, by multiplexing the content information and the display timing information in the broadcast signal, which then is transmitted. For example, the display of the content information or a part thereof can be interlocked with the broadcast content.

Also, in this configuration, the broadcast signal may be a television broadcast signal. The content information and the timing information may be multiplexed in the television broadcast signal by inserting them into the vertical blanking intervals of the television broadcast signal. Also, the timing information can be display time for the content information. The display time can be expressed as the time relative to the time when the content information was received. Also, the content information can be program code and hypertext (including hypermedia) (e.g., web pages supplied by a WWW (World Wide Web) server on the Internet).

Also, according to the first technical feature, the information display apparatus comprises: means for receiving a broadcast signal having multiplexed therein, content information and information regarding timing for displaying the content information on a display device; means for extracting the timing information and the content information from the received broadcast signal; and means for displaying at least a part of the content information on the display device, based upon the timing information.

In this configuration, also, the display timing information is utilized in order to display the content information or a part thereof such that they are interlocked to the broadcast content.

Also, according to the first technical feature, the information transmission and display method comprises the steps of: transmitting a broadcast signal that contains content information and information regarding timing for displaying the content information on a display device; receiving the broadcast signal; extracting the timing information and the content information from the broadcast signal; and displaying at least a part of the content information on the display device, based upon the timing information.

In this configuration, it is possible to display the contents with a timing that differs from the reception timing.

Also, according to this first technical feature, the information display apparatus comprises: means for receiving a broadcast signal containing content information and information regarding timing for displaying the content information on a display device; means for extracting the timing information and the content information from the received broadcast signal; and means for displaying at least a part of the content information on the display device, based upon the timing information.

In this configuration, also, it is possible to display the contents with a timing that differs from the reception timing.

(2) Data Source Specification Method

According to the second technical feature of the present embodiment, the information transmission and display method comprises the steps of: multiplexing, in a broadcast signal, source information that specifies a source of certain content information, said source information not being included in content information; transmitting the multiplexed broadcast signal; receiving the multiplexed broadcast signal; extracting the source information from the multiplexed broadcast signal; retrieving the certain content information from the source, based upon the source information; and displaying on a display device at least a part of the certain content information received from the source.

According to this configuration, based upon this source information, it is possible to receive content information from a medium other than the broadcast signal, and it is possible to utilize the content information by overcoming the restriction of the broadcast signal multiplexing capacity.

In this configuration, the broadcast signal may be a television broadcast signal. The source information may be multiplexed by inserting it into vertical blanking intervals of a television broadcast signal. The source may be a broadcast signal different from the multiplexed broadcast signal. The different broadcast signal may be a broadcast signal transmitted from a satellite. The different broadcast signal may be a broadcast signal transmitted by wire. The source information may be information stored in an information storage device provided on the side that receives the multiplexed broadcast signal.

Further, the content information may be hypertext. Still further, the content information may contain a program code.

Also, according to the second technical feature, the information display apparatus comprises: means for receiving a broadcast signal having source information multiplexed therein, said source information specifying a source of certain content information, and not being included in content information; means for extracting the source information from the received broadcast signal; means for retrieving the certain content information from the source, based upon the source information; a display device; and means for displaying at least a part of the certain content information on the display device.

Also, according to this second technical feature, the information transmission and display method comprises the steps of: transmitting a broadcast signal that contains source information that specifies a source of certain content information, said source information not being included in content information; receiving the broadcast signal; extracting the source information from the broadcast signal; receiving the certain content information from the source, based upon the source information; and displaying on a display device at least a part of the certain content information received from the source.

Also, according to this second technical feature, the information display device comprises: means for receiving at a broadcast signal containing source information that specifies a source of certain content information, said source information not being included in content information; means for extracting the source information from the received broadcast signal; means for retrieving the certain content information from the source, based upon the source information; a display device; and means for displaying at least a part of the certain content information on the display device.

(3) Cache Method

Also, according to the third technical feature of this embodiment, the information transmission and display method comprises the steps of: multiplexing, in a broadcast signal, content information, information regarding timing for displaying the content information on a display device, and information regarding instructions for temporary storage of the content information; transmitting the multiplexed broadcast signal; receiving the broadcast signal; extracting, from the received broadcast signal, the content information, the timing information, and the information regarding instructions for the temporary storage; temporarily storing the content information on a temporary storage device; in response to the information regarding instructions for the temporary storage, forcibly deleting corresponding information among the content information temporarily stored; and retrieving the content information from the temporary storage based on the timing information and displaying on a display device at least a part of the content information thus retrieved.

In this configuration, the temporary storage device can be utilized effectively because the content information, which need not be stored in the temporary storage device (e.g., an area on the hard disk), is deleted forcibly from the temporary storage device.

Also, according to the third technical feature of this embodiment, the information display device comprises: means for receiving a broadcast signal having multiplexed therein, content information, information regarding timing for displaying the content information on a display device, and information regarding instructions for temporary storage of the content information; means for extracting, from the received broadcast signal, the content information, the timing information, and the information regarding instructions for the temporary storage; means for temporarily storing the content information; means, in response to the information regarding instructions for the temporary storage, for forcibly deleting corresponding information among the content information temporarily stored; and means for retrieving the content information from the temporary storage device based on the timing information, and displaying on the display device at least a part of the content information thus retrieved.

Also, in this configuration, the temporary storage means can be utilized effectively because the content information, which need not be stored in the temporary storage means, is deleted forcibly from the temporary storage means.

Also, in this configuration, the broadcast signal may be a television broadcast signal. The content information, the timing information, and the information regarding instructions for temporarily storing the content information may be multiplexed in a television broadcast signal by inserting the same to the vertical blanking intervals of the television broadcast signal.

Also, the timing information may be the display time for the content information. Furthermore, the display time can be expressed as the time relative to the time when the content information was received.

Also, the timing information may be used as the information related to the temporary storage and in this design, when the timing information takes a specific value, the content information corresponding to the timing information is deleted from the temporary storage means. In this case, the specific value may be a relative time of all ones.

Also, at least some of the content information to be deleted from the temporary storage means may be deleted from the temporary storage means after being displayed on the display device.

Also, according to this third technical means, the information transmission and display method comprises the steps of: transmitting a broadcast signal that contains content information, information regarding timing for displaying the content information on a display device, and information regarding instructions for temporary storage of the content information; receiving the broadcast signal; extracting, from the received broadcast signal, the content information, the timing information, and the information regarding instructions for the temporary storage; temporarily storing the content information on a temporary storage device; in response to the information regarding instructions for the temporary storage, forcibly deleting corresponding information among the content information temporarily stored; and retrieving the content information from the temporary storage device based upon the timing information, and displaying on the display device at least a part of the content information thus retrieved.

Also, according to this third technical feature, the information display apparatus comprises: means for receiving a broadcast signal containing the content information, information regarding timing for displaying the content information on a display device, and information regarding instructions for temporary storage of the content in formation; means for extracting, from the received broadcast signal, the content information, the timing information, and the information regarding instructions for the temporary storage; temporary storage means for temporarily storing the content information; means, in response to the information regarding instructions for the temporary storage, for forcibly deleting corresponding information among the content information stored temporarily in the temporary storage means; and means for retrieving the content information from the temporary storage means, based upon the timing information, and displaying on the display device at least a part of the content information thus retrieved.

(4) Layout Specification Method

According to the fourth technical feature of this embodiment, the information transmission and display method comprises the steps of: multiplexing, in the broadcast signal, content information and layout information that specifies a layout of display areas in which the content information is displayed; transmitting the multiplexed broadcast signal; receiving the multiplexed broadcast signal; extracting, from the multiplexed broadcast signal, the content information and the layout information; and displaying at least a part of the content information on the display device, with the layout corresponding to the layout information.

According to this configuration, the supply side of the content information can specify the browser layout, so the feeling appropriate to the content information can be provided to the user.

Also, in this configuration, the broadcast signal may be a television broadcast signal. Also, the content information and the layout information may be multiplexed in a television broadcast signal by inserting them into its vertical blanking intervals.

Also, the timing information may be the display time for the content information. It may be expressed as as the time relative to the time when the content information was received. Furthermore, the content information may be hypertext.

Also, according to the fourth technical feature, the information display apparatus comprises: means for receiving a broadcast signal having multiplexed therein, content information and layout information that specifies a layout of display areas of the content information; means for extracting, from the received broadcast signal, the content information and the layout information; a display device; and means for displaying at least a part of the content information on the display device, with the layout corresponding to the layout information.

In this configuration, also, the supply side of the content information can specify the browser layout, so the feeling appropriate to the content information can be provided to the user.

Also, according to this fourth technical feature, the information transmission and display method comprises the steps of: transmitting a broadcast signal that contains the content information and layout information that specifies a layout of display areas in which the content information is displayed; receiving the broadcast signal; extracting, from the broadcast signal, the content information and the layout information; and displaying at least a part of the content information on a display device, with the layout corresponding to the layout information.

Also, according to this fourth technical feature, the information display apparatus comprises: means for receiving a broadcast signal containing content information and layout information that specifies a layout of display areas of the content information; means for extracting, from the received broadcast signal, the content information and the layout information; a display device; and means for displaying at least a part of the content information on the display device, with the layout corresponding to the layout information.

(5) Data Protection Method

According to the fifth technical feature of the present embodiment, the information transmission method comprises the steps of: multiplexing, in the broadcast signal, protected content information and protection information that indicates a protection technique for the content information; transmitting the multiplexed broadcast signal; receiving the multiplexed broadcast signal; extracting from the multiplexed broadcast signal the protected content information and the protection information; and converting the protected content information to usable content information, by means of a unprotection method corresponding to the protection information.

According to this configuration, when a broadcast signal having protected content information multiplexed therein, is transmitted, protection information that specifies the protection method is also transmitted, so unprotection can be performed easily, even if a different protection method is adopted for each content information.

Also, in this configuration, there may be an additional step in which the site that manages the unprotection method is notified of the usage state of the unprotection method. In this manner, charge management at the management side is ensured.

Also, the broadcast signal may be a television broadcast signal. The content information and the timing information may be multiplexed in a television broadcast signal by inserting them into its vertical blanking intervals. Also, the protection method can be encryption. Also, the protection method can be scrambling. Also, the content information can be display information displayed on a display device. Furthermore, the content information can be a program code.

Also, according to the fifth technical feature, the information receiver comprises: means for receiving a broadcast signal having multiplexed therein, protected content information and protection information that specifies a method for protecting the content information; means for extracting, from the received broadcast signal, the protected content information and the protection information; and means for converting the protected content information to usable content information, by means of an unprotection method corresponding to the protection method.

According to this configuration, when protected content information is transmitted after being multiplexed in the broadcast signal, the protection information that specifies the protection method also is transmitted, so it is possible to unprotect the protected content information easily, even if a different protection method is adopted for each content information piece.

In this structure, there may be an additional step in which the site that manages the unprotection information is notified of the usage state of the unprotection information.

According to the fifth technical feature, the information transmission method comprises the steps of: transmitting a broadcast signal containing protected content information and protection information that specifies a method for protecting the content information; receiving the broadcast signal; extracting from the broadcast signal the protected content information and the protection information; and converting the protected content information to usable content information, by means of the unprotection method corresponding to the protection information.

Also, according to this fifth technical feature, the information receiver comprises: means for receiving a broadcast signal containing protected content information and protection information that specifies a method for protecting the content information; means for extracting, from the received broadcast signal, the protected content information and the protection information; and means for converting the protected content information to usable content information, by means of the unprotection method corresponding to the protection method.

(6) Icon Display

According to the sixth technical feature of the present embodiment, the information transmission and display method comprises the steps of: multiplexing in the broadcast signal, display object information related to content information; transmitting the multiplexed broadcast information; receiving the multiplexed broadcast information; extracting, from the multiplexed broadcast signal, the display object information; displaying on a display device the display object, based upon the display object information; and in response to a certain event to the display object displayed on the display device, executing certain processing corresponding to the content information for the content information.

According to this configuration, the user first views the display object and checks whether or not the contents are those the user desires to see or utilize. The user can then view and utilize the desired content information by clicking, etc.

Also, in this configuration, the contents may be multiplexed in the broadcast signal. And the multiplexed broadcast signal may be received, and the content information may be extracted from the multiplexed broadcast signal. Also, the content information may be acquired from a source other than the broadcast signal.

Also, the broadcast signal may be a television broadcast signal. Also, the display object information may be multiplexed in a television broadcast signal by inserting it into the vertical blanking interval of the television broadcast signal.

Also, when the content information is information to be displayed, the certain processing may be display of the content information on the display device. Furthermore, when the content information specifies the information source, the certain processing can include the acquisition of information from the information source.

Also, the display object may have a hierarchical structure. When the certain event occurs for a high-level display object, a menu may appear as displaying one or multiple low-level display objects. Also, the display object may be an icon.

Also, according to the sixth technical feature, the information display apparatus comprises: means for receiving a broadcast signal having multiplexed therein, display object information related to the content information; means for extracting the display object information from the multiplexed broadcast signal; a display device; means for displaying the display object on the display device, based upon the display object information; and means, in response to a certain event to the display object displayed on the display device, for executing certain processing corresponding to the content information, for the content information.

In this configuration, also, the user first views the display object and checks whether or not the contents are those the user desires to see or utilize. The user can then view and utilize the desired content information by clicking, etc.

Also, according to the sixth technical feature, the information display apparatus comprises: means for receiving a broadcast signal having multiplexed therein, content information and display object information related to the content information; means for extracting the content information and the display object information from the multiplexed broadcast signal; a display device; means for displaying the display object on the display device, based upon information regarding the display object; and means, in response to a certain event to the display object displayed on the display device, for executing certain processing corresponding to the content information, for the content information.

Also, according to the sixth technical feature, the information transmission and display method comprises the steps of: transmitting a broadcast signal that contains display object information related to content information; receiving the broadcast signal; extracting the display object information from the broadcast signal; displaying the display object on a display device, based upon the display object information; and, in response to a certain event to the display object displayed on the display device, executing certain processing corresponding to the content information, for the content information.

Also, according to the sixth technical feature, the information display apparatus comprises: means for receiving a broadcast signal containing display object information related to the content information; means for extracting the display object information from the broadcast signal; a display device; means for displaying the display object on the display device, based upon information regarding the display object; and means, in response to a certain event to the display object displayed on the display device, for executing certain specified processing corresponding to the content information, for the content information.

(7) Automatic Data Retrieval Method

According to the seventh technical feature of the present embodiment, the information transmission and display method comprises the steps of: multiplexing, in the broadcast signal, certain content information and supplementary information related to other content information to be retrieved in response to display of the certain content information; transmitting the multiplexed broadcast signal; receiving the multiplexed broadcast signal; extracting the certain content information and the supplementary information, from the multiplexed broadcast signal; displaying the certain content information thus extracted; acquiring the other content information based upon the extracted supplementary information; and displaying the other content information thus acquired.

In this configuration, by utilizing supplementary information transmitted together with the content information, it is possible to display automatically other content information by retrieving other content information from the specified location in response to the display of the content information.

According to the seventh technical feature, the information transmission and display method comprises the steps of: receiving a broadcast signal having multiplexed, certain content information and supplementary information related to other content information to be retrieved in response to display of the certain content information; extracting the certain content information and the supplementary information, from the broadcast signal; displaying the certain content information thus extracted; acquiring the other content information based upon the extracted supplementary information; and displaying the other content information thus acquired.

In this configuration, also, it is possible to display automatically other content information, when content information transmitted by multiplexing in the broadcast signal is displayed.

Also, in this configuration, the broadcast signal may be a television broadcast signal. The certain content information and the supplementary information may be multiplexed in a television broadcast signal by inserting then into the vertical blanking intervals of the television broadcast signal. The supplementary information may contain information that specifies the location where the other content information is stored. The location may be a location on a network. Furthermore, the location may be a transmission path by means of broadcasting.

Also, according to the seventh technical feature, the information display apparatus comprises: means for receiving a broadcast signal having multiplexed, certain content information and supplementary information relating to other content information to be retrieved in response to display of the certain content information; means for extracting the certain content information and the supplementary information, from the broadcast signal; means for displaying the certain content information thus extracted; means for acquiring the other content information based upon the extracted supplementary information; and means for displaying the other content information thus acquired.

In this configuration, also, it is possible to display automatically other content information, when content information transmitted by multiplexing in the broadcast signal is displayed.

In this configuration, the means for displaying the certain content information and the means for displaying the other content information may be the same.

Also, according to this seventh technical feature, the information transmission and display method comprises the steps of: transmitting a broadcast signal containing supplementary information relating to content information to be retrieved automatically; receiving the broadcast signal; extracting the supplementary information from the broadcast signal; and acquiring the content information based upon the extracted supplementary information.

Also, according to this seventh technical feature, the information display apparatus comprises: means for receiving a broadcast signal containing supplementary information relating to content information to be retrieved automatically; means for extracting the supplementary information from the broadcast signal; and means for acquiring the content information based upon the extracted supplementary information.

(8) Program Reservation

According to the eighth technical feature of the present embodiment, the broadcast signal transmission and reception method comprises the steps of: multiplexing information regarding broadcast programs in a broadcast signal; transmitting the multiplexed broadcast signal; receiving the multiplexed broadcast signal; extracting the information regarding the broadcast programs, from the multiplexed broadcast signal; and selecting among channels of a broadcast receiver based on the extracted information regarding the broadcast programs.

In this configuration, it is possible to acquire easily the information regarding the broadcast programs, and the desired station selection can be reserved easily based upon the selection, etc. with the information.

Also, according to this technical feature, the broadcast signal reception method comprises the steps of: receiving a broadcast signal having multiplexed therein, information regarding broadcast programs; extracting the information regarding the broadcast programs, from the multiplexed broadcast signal; displaying the information regarding the extracted broadcast programs; and selecting among channels of a broadcast receiver in order to receive a broadcast program selected based upon the displayed information regarding the broadcast programs.

In this configuration, also, it is possible to acquire easily the information regarding the broadcast programs, and the desired station selection can be reserved easily based upon the selection, etc. with the information.

Also, the broadcast signal may be a television broadcast signal. And, the information regarding broadcast programs may be multiplexed by inserted it into the vertical blanking intervals of the television broadcast signal.

Also, according to this technical feature, the broadcast signal receiver comprises: means for receiving a broadcast signal having multiplexed therein, information regarding broadcast programs; means for extracting information regarding the broadcast programs, from the multiplexed broadcast signal; means for displaying the extracted information regarding the broadcast programs; and means for selecting among channels of a broadcast receiver in order to receive a broadcast program selected based upon the displayed information regarding the broadcast programs.

In this configuration, also, it is possible to acquire easily the information regarding the broadcast programs, and the desired station selection can be reserved easily based upon the selection, etc. with the information.

Also, in this configuration, means for indicating whether or not to record the selected broadcast program and means for recording the program selected for recording may also be provided.

Also, according to this technical feature, the broadcast signal receiver comprises: means for receiving a broadcast signal having multiplexed therein, information regarding broadcast programs and information regarding start of broadcast program recording; means for extracting the information regarding the broadcast programs, from the multiplexed broadcast signal; means for displaying the information regarding the extracted broadcast programs; means for selecting among channels of a broadcast receiver in order to receive a broadcast program selected based upon the displayed information regarding the broadcast programs; means for extracting information regarding start of broadcast program recording, from the multiplexed broadcast signal; and means for starting the recording of the broadcast program, based upon the extracted information regarding the start of the broadcast program recording.

In this configuration, it is possible to acquire easily the information regarding the broadcast programs, and the desired station selection and recording can be reserved easily based upon upon the selection, etc. with the information.

Also, according to this technical feature, the broadcast signal transmission and reception method comprises the steps of: multiplexing information regarding start of broadcast program recording in a broadcast signal; transmitting the multiplexed broadcast signal; receiving the multiplexed broadcast signal; extracting the information regarding the start of the broadcast program recording, from the multiplexed broadcast signal; and starting the broadcast signal recording based upon the extracted information regarding the start of broadcast program recording.

In this configuration, it is possible to adjust the recording timing.

In this configuration, the information regarding the start of the broadcast program recording may be the information that triggers the recording of the broadcast signal upon the reception, or it may contain information regarding the time for starting the recording of the broadcast signal.

Also, according to this technical feature, the broadcast signal recording apparatus comprises: means for receiving a broadcast signal having multiplexed therein, information regarding start of broadcast program recording; means for extracting the information regarding the start of the broadcast program recording, from the multiplexed broadcast signal; and means for starting the broadcast signal recording based upon the extracted information regarding the start of the broadcast program recording.

In this configuration, also, it is possible to adjust the recording timing.

What is claimed is:

1. A method for information transmission and display, the display being formed by an information display apparatus which display a television program display area and an icon display area on a display device in a first mode and displays the television program display area, the icon display area and an HTML content display area on the display device in a second mode, the method comprising the steps of:

transmitting a broadcast signal of a television broadcast program that contains, together with said television broadcast program, HTML content information, time information indicative of time at which said HTML content information is supplied to said display device, and icon information related to said HTML content information and said time information;

receiving said broadcast signal;

extracting said content information, said time information, and said icon information from said broadcast signal;

storing said content information and said icon information thus extracted in a caching hard disk device;

based on said time information thus extracted, automatically retrieving content information and said icon information from said caching hard disk device, even without replay request operation at a receiving site;

displaying, in both of said first mode and said second mode, a picture of said television broadcast program in said television program display area and said icon information in said icon display area;

displaying, is said second mode, at least a part of said HTML content information retrieved from said caching hard disk device in said HTML content display area; and, moving from said first mode to said second mode in response to clicking on an icon in the icon display area, to open the HTML content display area and displaying an HTML content corresponding to said icon that was clicked.

2. An information display apparatus, which displays a television program display area and an icon display are in a first mode and displays the television program display area, the icon display area and an HTML content display area in a second mode on a display device, the apparatus comprising:

means for receiving a broadcast signal of a television broadcast program, containing, together with said television broadcast program, HTML content information, time information indicative of time at which said content information is supplied to said display device, and icon information related to said HTML content information and said time information;

means for extracting said HTML content information, said time information, and said icon information from said broadcast signal;

a caching hard disk device for storing said HTML content information and said icon information thus extracted;

means, based on said time information thus extracted, automatically retrieving the HTML content information and said icon information from said caching hard disk device, even without replay request operation at a receiving site; and means for displaying, in said first mode, a picture of said television broadcast program in said television program display area and said icon information in said icon information in the icon display area, and, displaying, in said second mode, a picture of said television broadcast program in the television program display area, said icon information in said icon display area, and at least a part of said HTML content information retrieved from said caching hard disk device, in said HTML content display area; and, means for switching from the first mode to the second mode in response to clicking on an icon in the icon display area to open said HTML content display area and display an HTML content corresponding to the clicked on icon.

* * * * *